(12) United States Patent
Huang et al.

(10) Patent No.: US 8,596,888 B2
(45) Date of Patent: Dec. 3, 2013

(54) AUTOMATIC CORE-ALIGNMENT FOR FUSION SPLICING DOUBLE-CLAD FIBERS

(75) Inventors: Wei-Ping Huang, Stockholm (SE); Kjell Ahlstedt, Jarfalla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 887 days.

(21) Appl. No.: 12/159,738

(22) PCT Filed: Dec. 29, 2006

(86) PCT No.: PCT/SE2006/001519
§ 371 (c)(1),
(2), (4) Date: Jun. 10, 2011

(87) PCT Pub. No.: WO2007/078242
PCT Pub. Date: Jul. 12, 2007

(65) Prior Publication Data
US 2011/0226019 A1  Sep. 22, 2011

(30) Foreign Application Priority Data
Dec. 30, 2005 (SE) ...................................... 0502950

(51) Int. Cl.
*G02B 6/36* (2006.01)
(52) U.S. Cl.
USPC ............................................. 385/97; 385/52
(58) Field of Classification Search
USPC ..................................................... 385/97, 52
See application file for complete search history.

(56) References Cited

U.S. PATENT DOCUMENTS

| 4,265,519 | A * | 5/1981 | Pomerantzeff | 351/221 |
| 4,742,305 | A * | 5/1988 | Stolarczyk | 324/334 |
| 5,011,259 | A * | 4/1991 | Lieber et al. | 385/55 |
| 5,570,446 | A * | 10/1996 | Zheng et al. | 385/98 |
| 5,572,313 | A * | 11/1996 | Zheng et al. | 356/73.1 |
| 5,904,413 | A * | 5/1999 | Ruegenberg et al. | 356/73.1 |
| 5,909,527 | A * | 6/1999 | Zheng | 385/96 |
| 6,186,675 | B1 * | 2/2001 | Ruegenberg | 385/96 |
| 6,399,936 | B1 * | 6/2002 | Hang et al. | 250/216 |
| 6,499,319 | B1 * | 12/2002 | Esmaeili | 65/484 |
| 6,788,861 | B1 * | 9/2004 | Utsui et al. | 385/119 |
| 7,003,200 | B2 * | 2/2006 | Huang et al. | 385/52 |

(Continued)

FOREIGN PATENT DOCUMENTS

| JP | A S60-046509 | 3/1985 |
| JP | A H10-047939 | 2/1998 |

(Continued)

*Primary Examiner* — Kaveh Kianni

(57) ABSTRACT

In aligning ends of optical fibers, e.g. ends of large mode area double-clad fibers (LMA-DCFs), in a fiber optic fusion splicer the best position of the object plane of the optical system for observing images of the cores of the fiber ends are first determined by maximizing the contrast of the core image, in particular the core image peak in intensity profiles. The alignment process may be performed by adjusting the offset distance between the observed cores in some suitable way, e.g. by using a cascade technique. In e.g. a process for prealigning the fiber ends the self-focusing effect of optical fibers can be used to first determine the best object plane position for observing the self-focusing effect and then the very pre-alignment operation can be performed. This may extend the range of image analysis allowing e.g. that alignment, in particular core alignment, can be performed without requiring direct information showing the position of sides or edges of the claddings in captured pictures.

8 Claims, 23 Drawing Sheets

(56) References Cited

U.S. PATENT DOCUMENTS

| | | |
|---|---|---|
| 7,006,741 B1 * | 2/2006 | Yu ............................. 385/121 |
| 7,061,522 B1 * | 6/2006 | Kojima et al. ................. 348/61 |
| 7,181,111 B2 * | 2/2007 | Ahrens ........................ 385/52 |
| 7,245,360 B2 * | 7/2007 | Huang et al. ................. 356/73.1 |
| 2002/0164132 A1 * | 11/2002 | Tian ............................. 385/98 |
| 2003/0142934 A1 * | 7/2003 | Pan et al. ..................... 385/116 |
| 2003/0164939 A1 * | 9/2003 | Esmaeili ....................... 356/73.1 |
| 2003/0172680 A1 * | 9/2003 | Huang et al. ................. 65/377 |
| 2004/0057680 A1 * | 3/2004 | Hersoug et al. ............... 385/97 |
| 2005/0047725 A1 * | 3/2005 | Ahrens ........................ 385/52 |
| 2005/0190371 A1 * | 9/2005 | Knuttel ........................ 356/479 |
| 2005/0254754 A1 * | 11/2005 | Huang et al. ................. 385/52 |
| 2006/0051043 A1 * | 3/2006 | Huang et al. ................. 385/134 |
| 2006/0133760 A1 * | 6/2006 | Hersoug et al. ............... 385/140 |
| 2006/0158655 A1 * | 7/2006 | Everett et al. ................ 356/479 |
| 2006/0193435 A1 * | 8/2006 | Hara et al. ................... 378/65 |
| 2007/0015969 A1 * | 1/2007 | Feldman et al. .............. 600/160 |
| 2007/0081772 A1 * | 4/2007 | Mendel et al. ............... 385/96 |
| 2008/0304788 A1 * | 12/2008 | Mannstadt et al. ............ 385/14 |
| 2009/0010601 A1 * | 1/2009 | Huang et al. ................. 385/97 |

FOREIGN PATENT DOCUMENTS

| | | |
|---|---|---|
| JP | 2000-028480 A | 1/2000 |
| JP | A 2000-205997 | 7/2000 |
| JP | 2011-125729 A | 6/2011 |

* cited by examiner

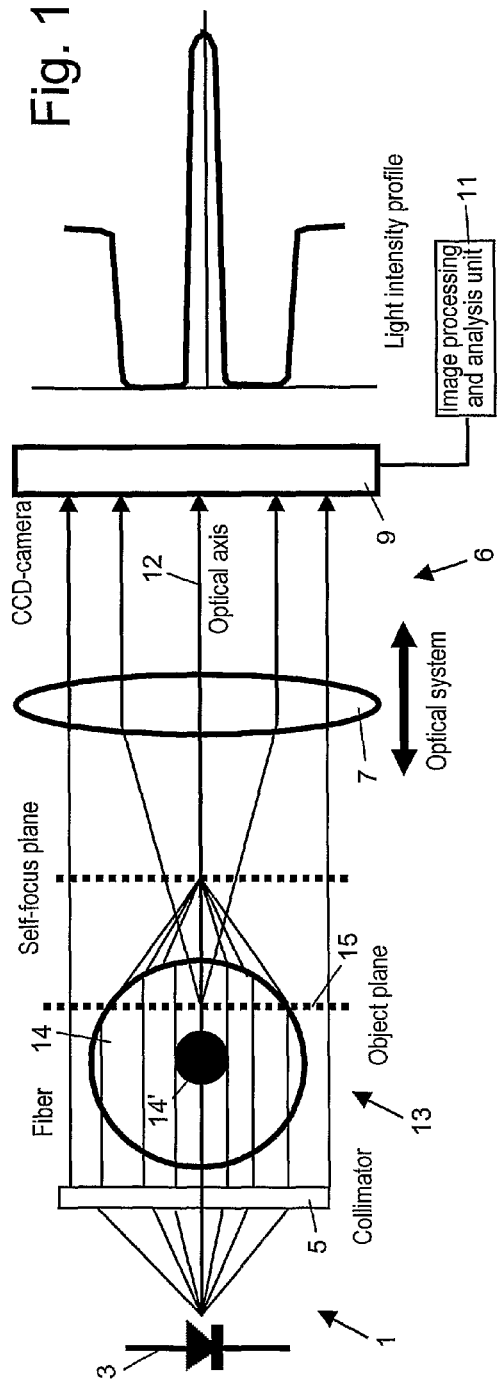
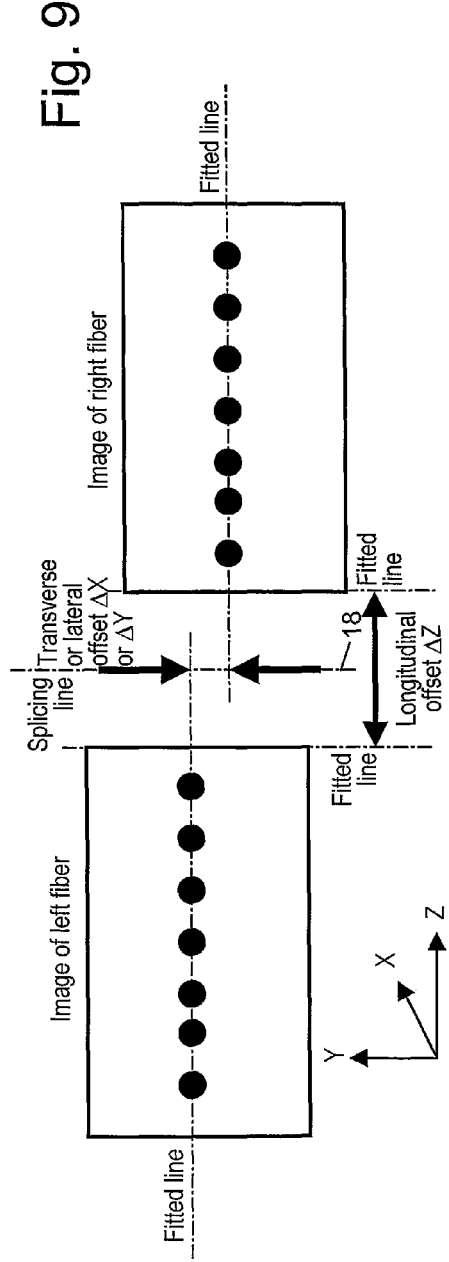

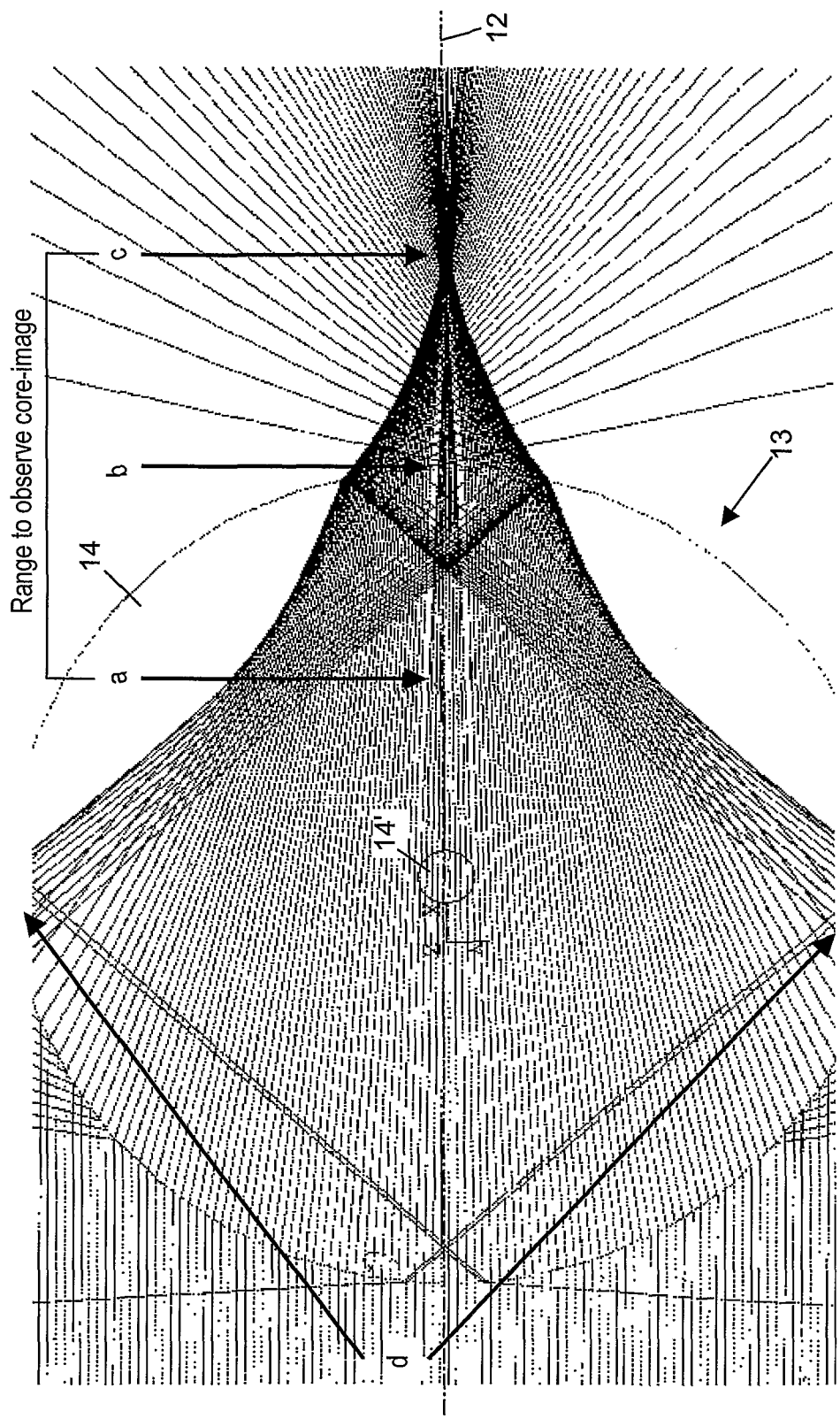

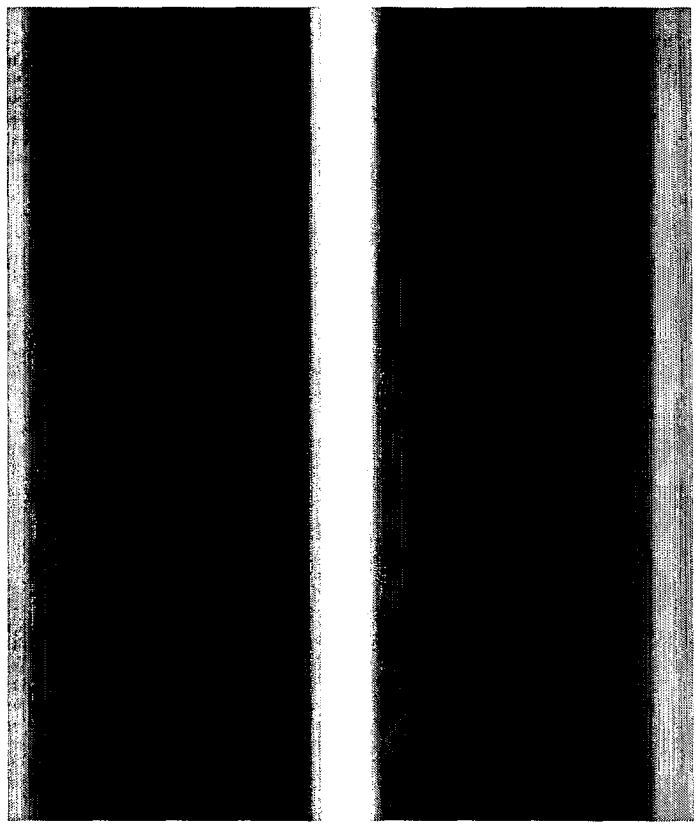
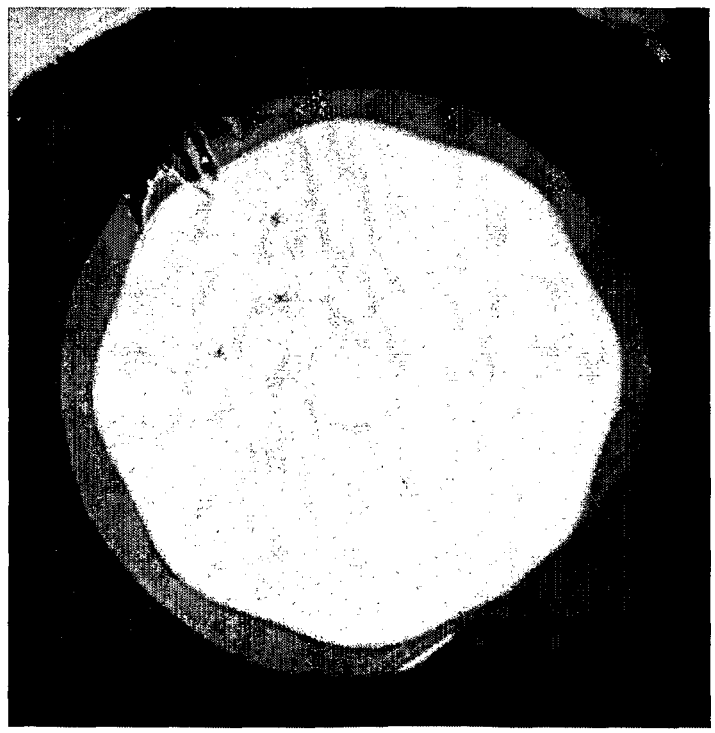
Fig. 5b

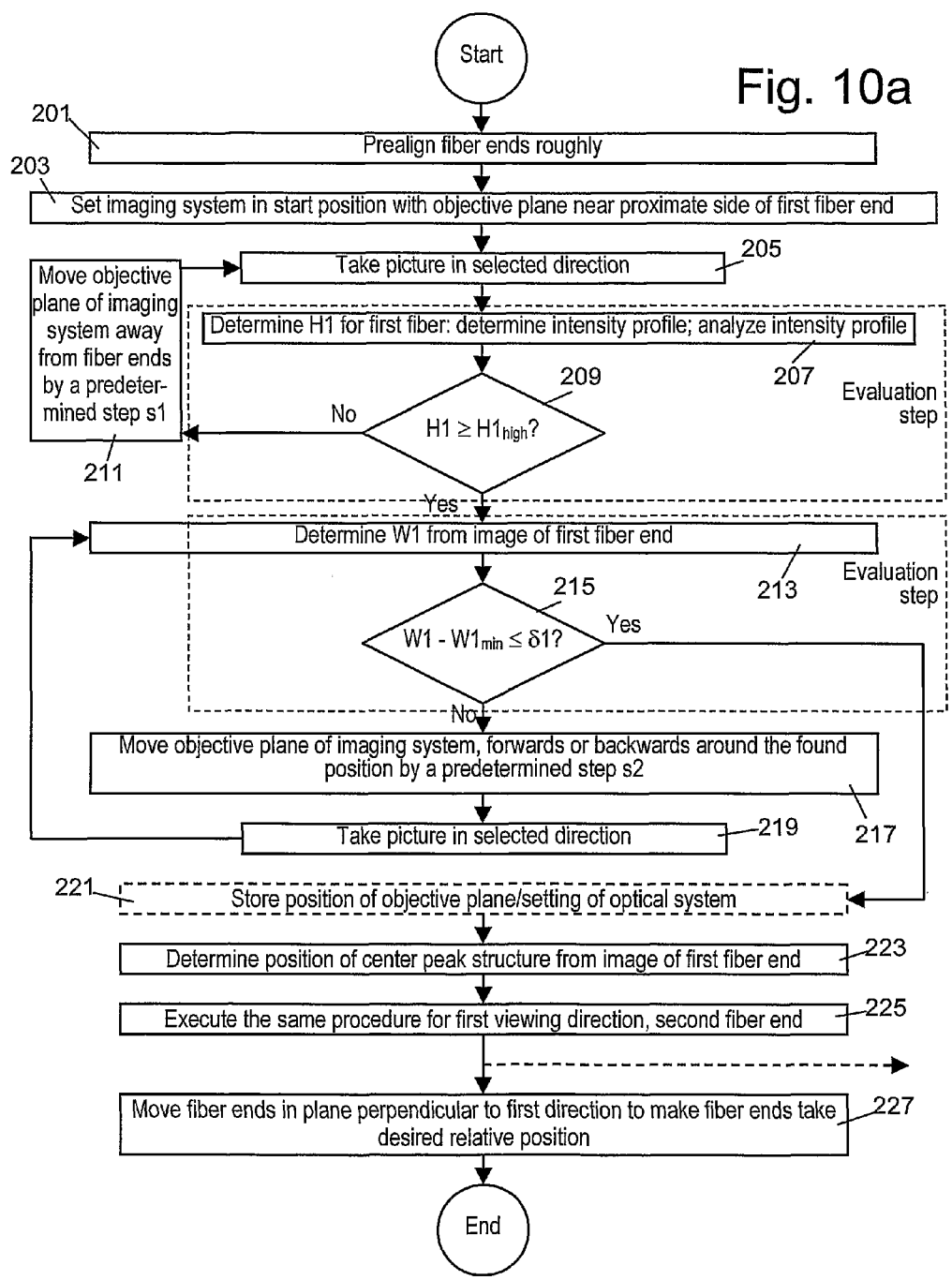

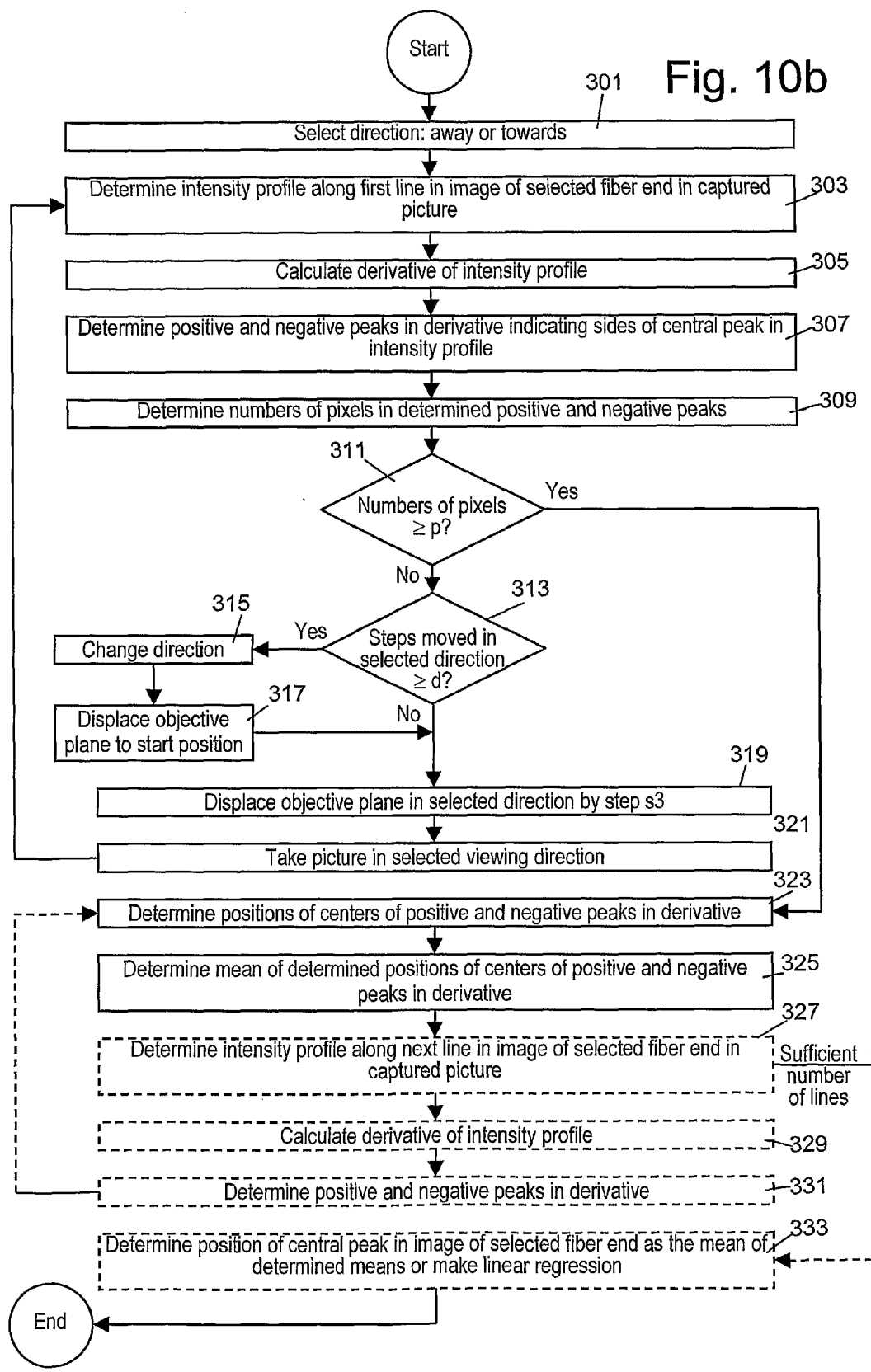

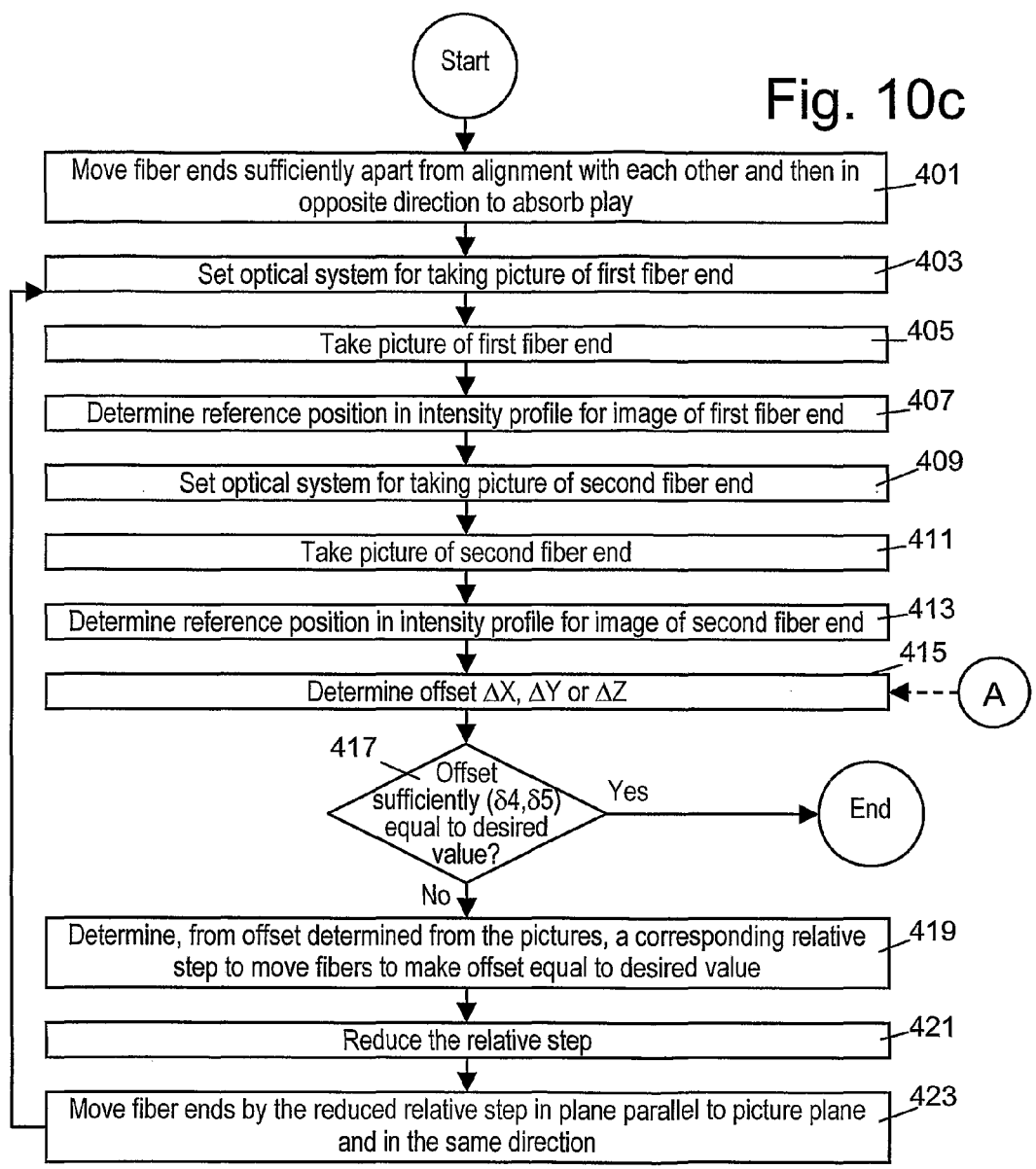

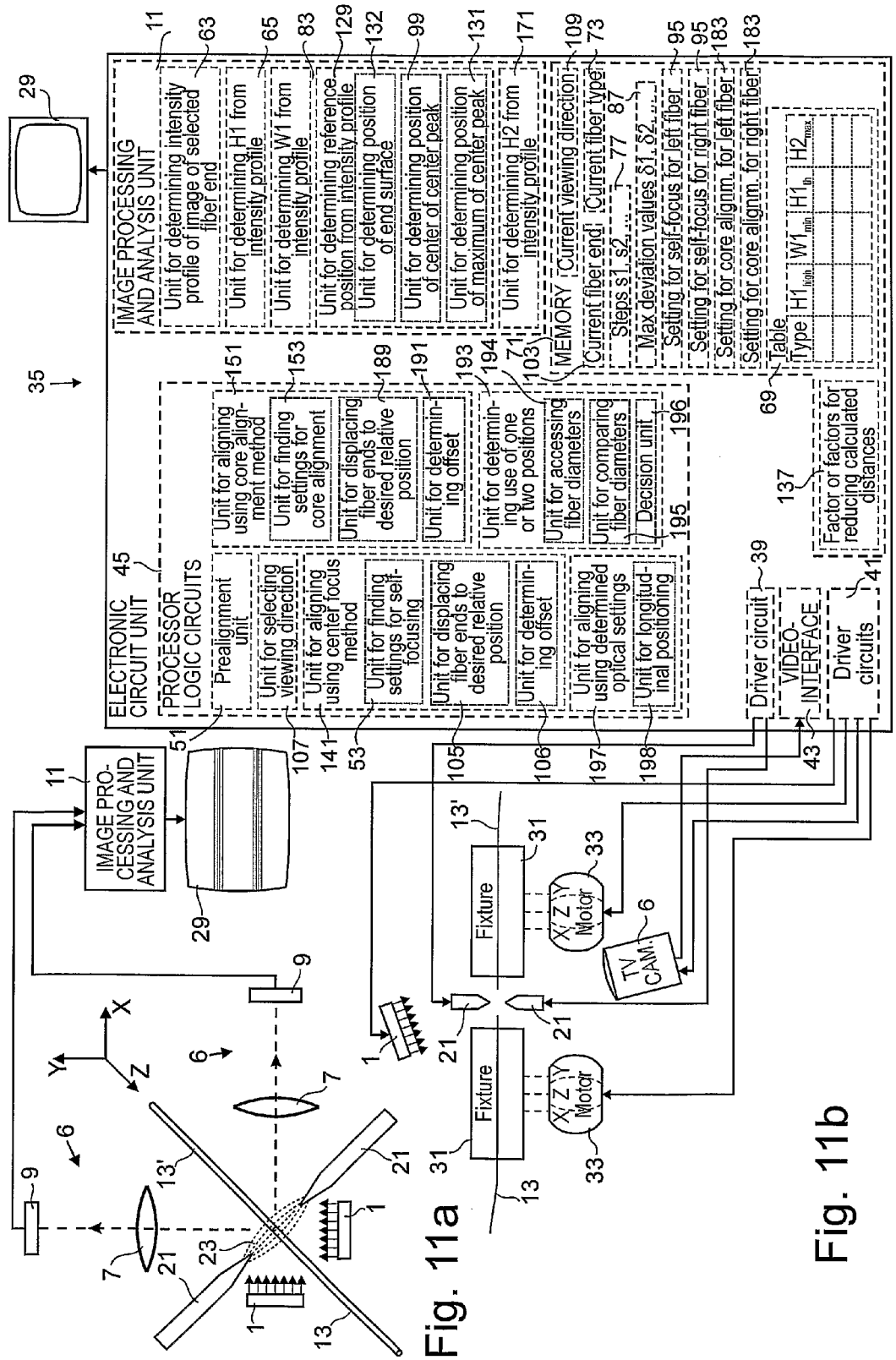

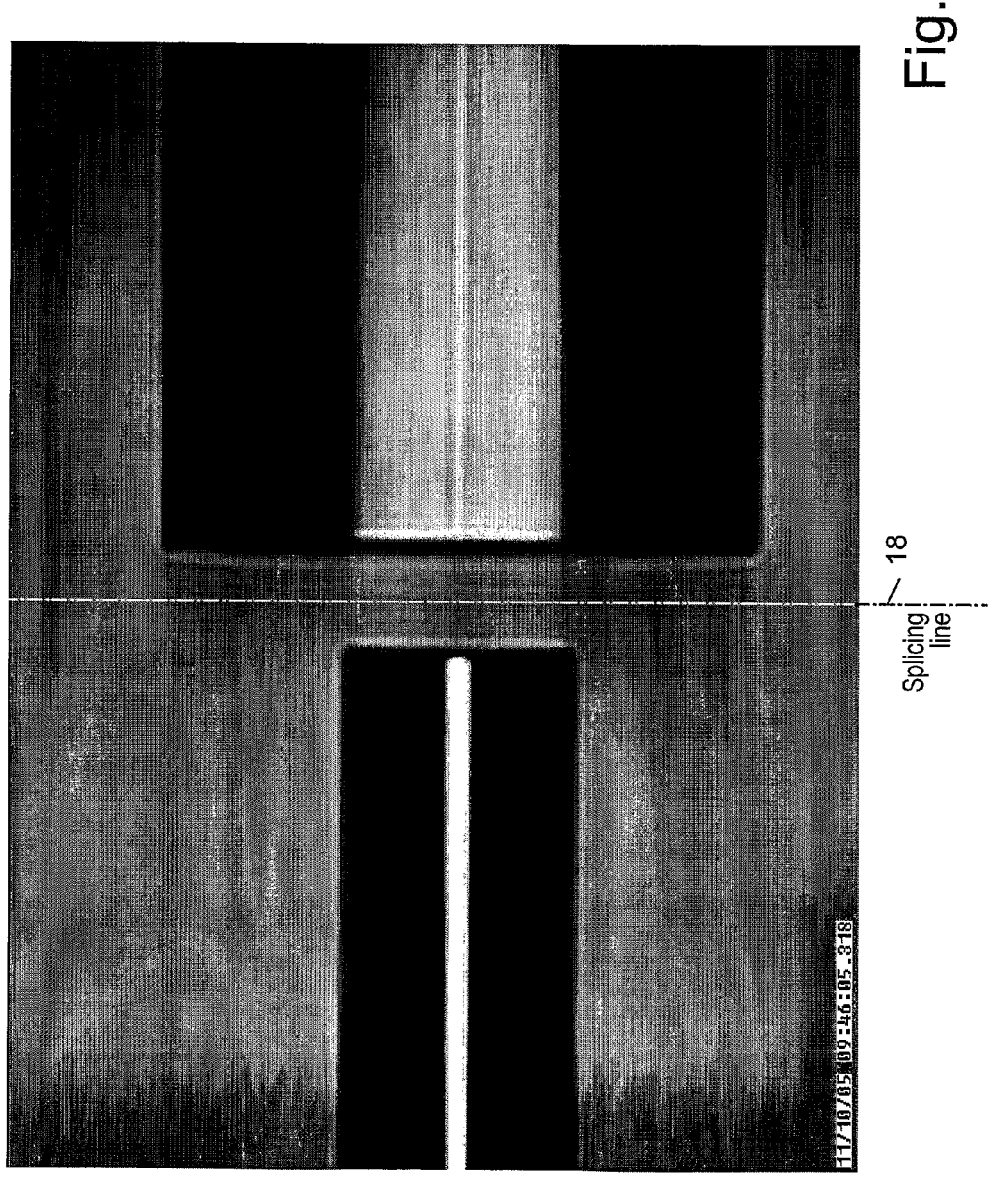

AUTOMATIC CORE-ALIGNMENT FOR FUSION SPLICING DOUBLE-CLAD FIBERS

RELATED APPLICATION

This application claims priority and benefit from Swedish patent application No. 0502950-9, filed Dec. 30, 2005, the entire teachings of which are incorporated herein by reference.

TECHNICAL FIELD

The present invention is related to alignment of optical fibers, in particular to methods for finding settings of optical systems for capturing pictures used in alignment operations, and also to a method and a device for fusion splicing optical fibers.

BACKGROUND

In recent years, fiber lasers have been considered to be serious alternatives to solid state and $CO_2$ lasers for military, aerospace, medical and industrial material processing applications. Fiber lasers are very attractive due mainly to their high output power as well as excellent beam quality and the flexibility of the design of the lasers. Large mode area double-clad fibers (LMA-DCF) are one of the key components in fiber lasers. In order to efficiently couple pump-energy into such an LMA-DCF and also to allow a high output power, the cladding of the LMA-DCF is designed to have a high numerical aperture and variously shaped cross-sections, e.g. round, octagon, square etc. The cladding diameters of LMA-DCFs are typically in the range of 300-1000 µm, depending on the level of the output power. The cores of LMA-DCFs are often doped with a high concentration of rare-earth elements, e.g. ytterbium, and their sizes can be as large as 50 µm with a low numerical aperture to reduce non-linear effects.

One of the major problems that deter the use of LMA-DCFs is the fact that it is very difficult to achieve high quality splices of such fibers using traditional splicing techniques. Due to general demands in the design of fiber lasers, fibers of different types have to be spliced to each other, e.g. splices between differently shaped LMA-DCFs, such as a round LMA-DCF spliced to an octagon LMA-DCF, an LMA-DCF containing rare-earth dopants spliced to an LMA-DCF not containing rare-earth dopants, and an LMA-DCF spliced to a conventional single mode optical fiber (SMF), the latter two fibers cladding diameters that differ very much from other, e.g. by a factor of three or more. The major difficulty in splicing LMA-DCF is the failure of traditional core-alignment processes which are used in conventional fusion splicers. Two primary problems can be observed. First, the information on cladding edges requested by traditional alignment processes could not be fulfilled since the size of LMA-DCF is too large to be handled by the imaging system used in conventional splicers. Second, it is difficult to simultaneously observe core images of two optical fibers for which there is a huge difference as to their cladding diameters and their structures. Thus, in practice, manual alignment processes assisted by power transmission measurements are often used to splice LMA-DCFs, resulting in a low efficiency of the manufacturing process and a low yield since the splices often have a too low quality.

The development of the conventional core alignment processes used today can be traced back to pioneering work two decades ago, cf. T. Katekuri et al., IEEE J. Lightwave Technol., Vol. 2, pp. 277-283, 1984. These core alignment processes are based upon analysis of core images extracted from light intensity profiles of the fibers to be spliced. In such processes, a core image of a considered fiber is obtained by illuminating the fiber from the side thereof using an external light source. It has been demonstrated theoretically as well as experimentally that the core image of a fiber can be resolved by placing the object plane of a high resolution imaging system near the fiber edge, as seen from the imaging system, where the light rays leave the fiber. Using information extracted from the core image, various automatic core alignment processes have been developed.

One of the core alignment processes based on image analysis is disclosed in various Japanese patents, see e.g. the Japanese patent 11194227 for Fujikura. Using these processes, in the pictures taken of fibers to be spliced, the vertical distance between the positions of the e.g. upper edge of the cladding and of the approximate center of the core image is measured for each fiber, the fibers as conventional assumed to be located horizontally in the pictures. The alignment is performed by then displacing the two fibers in relation to each other so that the difference of said two measured distances of the two fibers becomes equal to the vertical difference between the positions of the upper edges of the claddings of the two fibers. Since this method relies on the information extracted from both the core images and images of the edges of the cladding, it is difficult to perform an accurate core alignment. Due to the significant differences in regard of refractive indices, light passing only through the claddings behaves differently compared to the light passing through both the cladding and the core. Thus, the optimum position of the object plane to get core images of a high quality is not equal to the optimum position to get images of the cladding edges that have a high quality. This fact implies that it may not be possible to simultaneously measure the positions of the core and the cladding edges of a fiber with a high accuracy, this in turn resulting in a degradation of the alignment accuracy when based on such pictures. The need for information about the position of the cladding edges in the alignment process also results in a need for special imaging systems including huge sensors that are very expensive and hence may not be cost effective in the manufacture of splicers.

A different method using so-called warm-fiber image analysis for core alignment is disclosed in e.g. U.S. Pat. No. 5,570,446 assigned to Ericsson. In this method, instead of illuminating the fibers with external light, an electric glow discharge giving a relatively low fusion temperature is used to heat the ends of fibers to be spliced before actually making the ends contact each other. Since the dopant concentration in the core of a fiber usually is much higher than that in the cladding, the thermal light emission from the core is much stronger than that from the cladding, this resulting in a picture in which there is a core image of the hot or warm fiber. By carefully analyzing a light intensity profile derived from such a warm-fiber picture, information on the position of the core of the fiber can be extracted for use in the core alignment process. Since this method does not require information on the positions of the edges of cladding, it is possible to perform the core alignment process with a high accuracy. It is found, however, that in the pre-heating step process used in this method it is very difficult to observe the core images in pictures of LMA-DCFs. This is because the energy needed for heating the cores of LMA-DCF fibers is much higher than that needed for conventional optical fibers used for communication, this fact resulting in thermal light emission that usually causes saturation of the imaging system of convention fusion splicers. An additional problem is the diffusion of the core dopants occurring in the pre-heating step. This diffusion can cause a significant expansion of the optical mode field diameter (MFD) and result in an MFD mismatch of the two fibers at the splice point, which may in turn give high optical losses in the splice.

Therefore, there is a need in the art to develop a method that can avoid the drawbacks of the existing techniques so that core alignment processes of a high accuracy can be performed for fibers of all types, particularly for LMA-DCFs.

A method of recentering the plane in which pictures are captured is disclosed in the published International patent application No. WO 01/86331, "Arc Recentering", wherein the capturing plane is moved dependent on the center of the electric arc.

SUMMARY

It is an object of the invention to provide methods for finding settings of imaging systems for capturing pictures used in operations for aligning optical fiber ends with each other.

It is another object of the invention to provide methods for aligning optical fiber ends with each other.

It is another object of the invention to provide methods and devices for splicing optical fiber ends to each other.

In a method for performing alignment of optical fiber ends, e.g. ends of large mode area double-clad fibers (LMA-DCFs), in a fiber optic fusion splicer the best object plane position of the optical system of the splicer for observing images of the cores of the fiber ends may be first determined by maximizing the contrast of the core image, in particular the core image peak in intensity profiles. The alignment process may be performed by adjusting the offset distance between the observed cores in some suitable way, e.g. by using a cascade technique. In another method, that may be e.g. used as a pre-alignment process, the self-focusing effect of optical fibers may be used to first determine the best focus position for observing the self-focusing effect and then the very pre-alignment operation can be performed. This may extend the range of image analysis allowing e.g. that alignment, in particular core alignment, can be performed without requiring direct information showing the position of cladding edges or of sides of the claddings in captured pictures.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

FIG. 1 is a schematic diagram of some main components of an imaging system for capturing pictures of an optical fiber included in a fiber splicer, FIG. 4 is a diagram of a ray tracing simulation where light passes through an SMF, FIGS. 5a, 5b are pictures taken at self-focusing planes for a round and an octagon 400 μm LMA-DCF, respectively, using the imaging system of a fiber splicer.

FIG. 9 is a schematic diagram illustrating a principle for determining a core offset, FIG. 10a is a flow chart of an alignment process for optical fiber ends based on the self-focusing effect, FIG. 10b is a flow chart of a process for determining the position of the center line in pictures of an optical fiber end taken using the self-focusing effect, FIG. 10c is a flow chart of an alignment process for optical fiber ends using a cascade method based on the self-focusing effect, FIG. 11a is a schematic of a fiber splicer in which main components of the imaging system are drawn, FIG. 11b is a schematic of a fiber splicer in which also main electrical components are drawn, FIG. 14b is a photograph or picture similar to FIG. 14a using the best setting of the imaging system for the right, thicker end for performing a core alignment operation.

DETAILED DESCRIPTION

Figure 2:
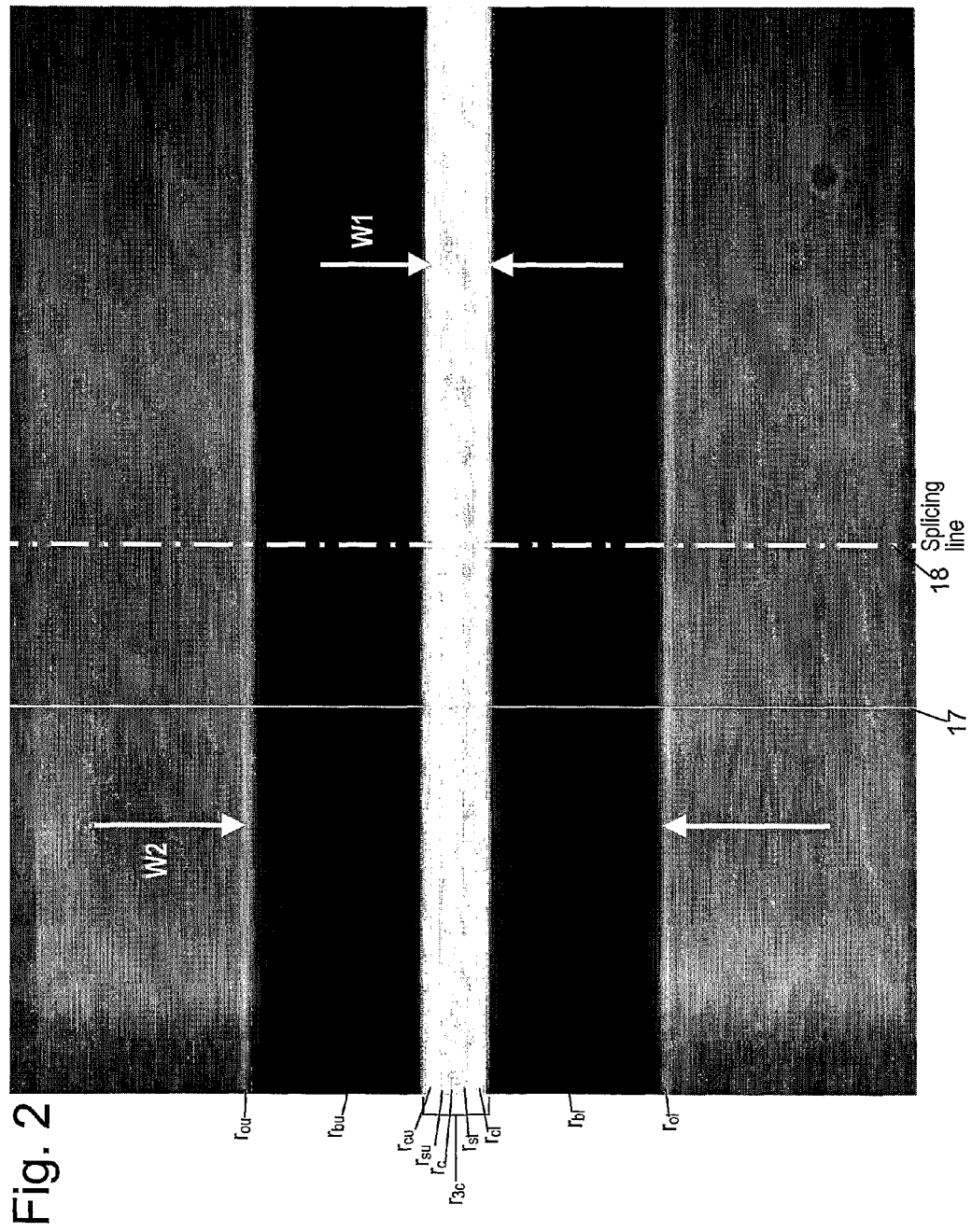
FIG. 2 is a typical picture of an SMF taken using the imaging system of a fiber splicer.

A method for splicing two optical fiber ends with each other will be described herein as executed in a fiber splicer, such as in e.g. an automatic fiber splicer. The splicing method may include a method of aligning the cores of the fiber ends to be spliced and the alignment method may in turn include a method for finding a suitable setting of an optical system for capturing pictures used in alignment operations, such a suitable setting including a position called an alignment position. In the alignment position an object plane of the optical system, considering the position of an image device, is located in some advantageous place for capturing pictures. The splicing method may also include particular methods for making a pre-alignment and for executing a multiple-step displacement operation for placing the fiber ends aligned with each other.

A conventional automatic fusion splicer, see the schematic of FIG. 1, for splicing optical fibers to each other basically has at least one image capturing system that typically includes a collimated light source 1, such as a light emitting diode 3 (LED) and a collimator 5, issuing a collimated light beam to an imaging system 6 including an optical system 7 in turn including e.g. a multiple-lens package, an image capturing device 9, e.g. a plate of the charged-coupled device (CCD) type, and an electronic image processing and analyzing unit 11, also called an image unit. The collimated light source, the imaging system and their components are located to have a common optical axis 12. In order to extract detailed structure information about the object to be imaged, the imaging system 6 is designed so that the object plane 15 of the optical system is movable in relation to the object to be imaged. In a fusion splicer the object is an optical fiber 13 which actually in most cases includes two adjacent ends of two optical fibers to be spliced to each other. The optical fiber has a cladding 14 and most frequently also a core 14'. The optical system images only objects located in the object plane to sharp images captured by the image capturing device in an image plane that here is the front surface of the image capturing device 9. In practice, the displacement of the object plane is typically made by moving the optical system 7 backwards and forwards with respect to the fiber 13 that may be assumed to have a well defined reference position. Hence, in the imaging capturing system, the positions of the light source 1 and of the image capturing device 9 are fixed, whereas the optical system 7 is movable. Also, the object 13 can be moved but for the alignment this movement only occurs in a plane perpendicular to the optical axis 12 which also is called the current viewing direction. The object plane 15 can also be considered as the observation plane when observing the object such as an optical fiber, the terms object plane and observation plane thus denoting the same thing and used herein alternatingly with each other.

By positioning the object plane 15 of the optical system 7 e.g. near the front edge or the near portion of the object to be observed which henceforth is assumed to be a fiber 13 or more exactly a fiber end, a picture including an image of the fiber 13 can be obtained. FIG. 2 is a typical picture of a single mode fiber (SMF) that can also be considered as including images of the ends of single mode fibers (SMF) of the same kind, separated at a splicing line 18, captured for such a position of the object plane. For the fiber, and each fiber end, the picture observed or captured contains distinct horizontally elongated or longitudinal fields, also called longitudinal regions, longitudinal areas, longitudinal image areas, etc., having different light intensities or brightnesses, respectively, these two latter terms being used herein alternatingly with each other to indicate the same kind of information. The brightness in a captured picture is typically measured as grey-scale levels. In particular, information required for performing alignment processes, such as for core alignment and center-focus alignment processes to be described herein, can be obtained by finding a light intensity profile in a captured picture, such as at the position indicated by the line 17 in FIG. 2. The light intensity profile, also called a transverse intensity distribution, is the brightness, also called light intensity as mentioned above, measured in a captured picture along a line substantially perpendicular to the longitudinal axis of the image of a fiber as a function of the position along the line, most often as function of the vertical position in conventionally captured pictures in which the fiber or the fiber ends has/have a horizontal orientation as in FIG. 2. To extract information about the position of a fiber end, such as the position of the core 14' and the positions of the edges of the cladding 14, the positions and brightnesses of the various fields in the observed/captured pictures and in particular the light intensity profiles may be carefully observed and analyzed, such as by the image processing and analyzing unit 11.

Figure 3:
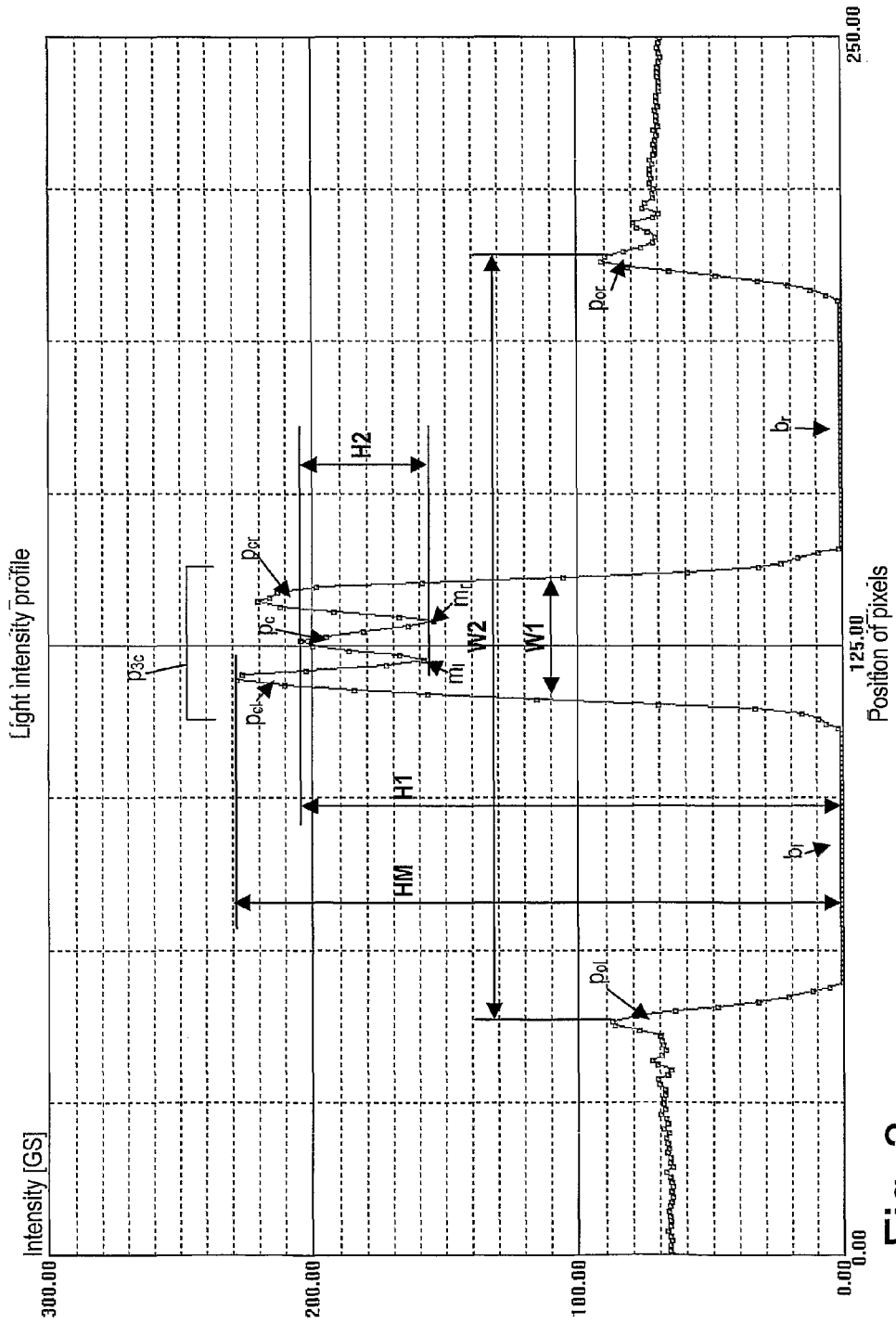
FIG. 3 is a graph of a light intensity profile extracted from FIG. 2.

The light intensity profile measured at the line 17 in FIG. 2 is drawn in the diagram of FIG. 3 in which it can be observed that the profile includes a well-resolved five-peak structure, the five peaks corresponding to five distinct fields in FIG. 2 that are surrounded by fields having smaller brightnesses/light intensities. The two outside peaks $p_{ol}$, $p_{or}$ represent the upper and lower, outer edges of the cladding 14, as seen from or by the imaging system 6. The distance W2 between the images of the upper and lower edges of the cladding in the picture is proportional to the physical cladding diameter of the imaged fiber 13 where the proportional constant is mainly determined by the magnification of the optical system 7. In order to understand and quantitatively explain the central three-peak structure $p_{3c}$, a ray tracing simulation for an SMF has been performed, see the diagram of FIG. 4, where thus the cladding 14 is assumed to have a constant or uniform refractive index different from the constant refractive index of the core 14'. The fiber end 13 is assumed to be illuminated by collimated light, i.e. a parallel light beam, as illustrated in FIG. 1. The simulation is accomplished by repeatedly applying the well-known Snell's law.

Light hitting the fiber 13 is refracted at the boundaries of the fiber to air and also inside the fiber if it passes regions having different or varying refractive indices. Generally, the fiber can be considered to work as a cylindrical optical lens, this fact called the "lens effect". At the boundary between the fiber and the air indicated by "d", as observed in the considered viewing direction, i.e. at the vertically outermost portions of the fiber, the optical axis 12 of the imaging system 6 and hence the observation direction assumed to be horizontal, the light refracted inside fiber 13 and the background light together indicate the edges of the fiber, which results in the images of the upper and lower edges of the cladding 14, i.e. two outermost peaks $P_{ol}$, $P_{or}$ shown in FIG. 3. These two peaks correspond to the two horizontal strip-shaped regions $r_{ol}$, $r_{ou}$ seen in FIG. 2 having a brightness exceeding the surrounding black or nearly black regions. The strong refraction of light inside the fiber results also in two areas including no rays. These two areas correspond to the "black areas" $r_{bl}$, $r_{bu}$ inside the image of fiber 13, cf. FIG. 2, and the regions $b_l$, $b_r$ in the intensity profile of FIG. 3.

By a close inspection of the focused light passing regions near the boundary of the core 14' to the cladding 14, it is found that the light undergoes an additional refraction when it passes through the core 14'. As a result, the light is split into three portions, this effect being observed for object planes 15 located within a certain interval between positions indicated by "a" and "c" in FIG. 4. For pictures captured with the object plane in this interval a central strip-shaped composite region $r_{3c}$ can be observed that has a brightness significantly exceeding that of the surrounding black regions $r_{bl}$ and $r_{bu}$ and is composed of three distinct regions, lower and upper bright regions $r_{cl}$, $r_{cu}$ and a central bright region $r_c$, these regions separated from each other by two narrow regions $r_{sl}$, $r_{su}$ having somewhat smaller brightnesses. The central composite region corresponds to a characteristic three-peak central structure $p_{3c}$ that can be observed in light intensity profiles derived from the corresponding pictures, the central bright region $r_c$ corresponding to a center peak $p_c$ and the lower and upper, central bright regions $r_{cl}$, $r_{cu}$ corresponding to side peaks $p_{cl}$, $p_{cr}$. It is clear that the central bright region $r_c$ and the center peak $p_c$ in the corresponding central structure $p_{3c}$ can be attributed to the contribution from the refracted light that has undergone double refractions, whereas the lower and upper central bright regions $r_{cl}$, $r_{cu}$ and the corresponding two side peaks $p_{cl}$, $p_{cr}$ are formed by light passing the cladding 14 only. By inspecting FIGS. 3 and 4, it is understood that the central bright region $r_c$ and the center peak $p_c$ contain information about the core, the center peak called the "core image peak". In contrast to the "core image peak", the two side peaks $p_{cl}$, $p_{cr}$, also called satellite peaks, in the central structure are called "cladding image peaks".

The degree of separation between the three central bright fields and correspondingly between the core image peak and the cladding image peaks is mainly determined by the difference between the refractive index of the core 14' and that of the cladding 14, which in turn is determined by the type of dopants and the concentration of dopants in the core and the cladding, and the design of the optical system 7. It can also be directly seen from FIG. 4 that the width W1 of the central composite bright field in FIG. 2 and correspondingly of the three-peak structure in the center of the profile, see FIG. 3, changes with changing the position of the object plane 15 of the optical system 7. In general, the smaller the distance between the core 14' and the object plane is, the larger is the width W1.

For convenience, in the following description of the core alignment processes, two parameters "H1" and "'H2" are introduced that are indicated in FIG. 3. The first parameter H1 represents the total contrast of the center bright field $r_c$, i.e. the difference between the maximum brightness in the center field and the average brightness of regions where only stray or "noise" light can be observed, such as in the black fields $r_{bl}$, $r_{bu}$ in FIG. 2. For a light intensity profile, the first parameter H1 is the maximum value of the core image peak $p_c$ with respect to the level of stray light, i.e. the level of light intensity in the "black areas" $b_l$, $b_r$ mentioned above. The position of the object plane 15 of the optical system 7 affects the magnitude of the parameter H1. The second parameter H2 represents the local contrast of the center bright field $r_c$, i.e. the difference between the maximum brightness in the center field and the mean of the minimum brightnesses of the two surrounding separating narrow darker fields $r_{sl}$, $r_{su}$ in the central composite bright field $r_{3c}$. For a light intensity profile, the second parameter H2 is the contrast of the core image peak and may be defined as the difference between the maximum of the core image peak $p_c$ and the mean value of the two minimums $m_l$, $m_r$ adjacent to the core image peak.

It is clear that among pictures captured for different locations of the object plane 15, the pictures having highest values of the second parameter H2 are the best ones for observing the core image, and hence the corresponding position of the object plane is the best for observing the core image. The values of the two parameters H1 and H2 may be taken as criteria in alignment processes, such as in a core alignment process, as will be described hereinafter.

In order to perform an accurate core alignment for optical fibers, in particular for LMA-DCFs, not including the drawbacks of existing technologies, a method for aligning cores of fibers such as LMA-DCFs has been developed. This method includes four key procedures or four key steps, including:

Performing a center-focus alignment process by using the lens-effect of the fiber—this process can also be used separately and also for fibers having no core.

Finding a core image by searching a region of object plane positions using the first parameter H1.

Determining a best object plane position for observing the core 14' using the second parameter H2.

Fast reducing offsets in different directions to predetermined values, in particular reducing the core offset to take a predetermined value, using a cascade process.

These procedures may be used in various combinations with each other or in combination with other methods or, such as the first one mentioned above, as the only alignment process used before splicing.

Figure 5A:
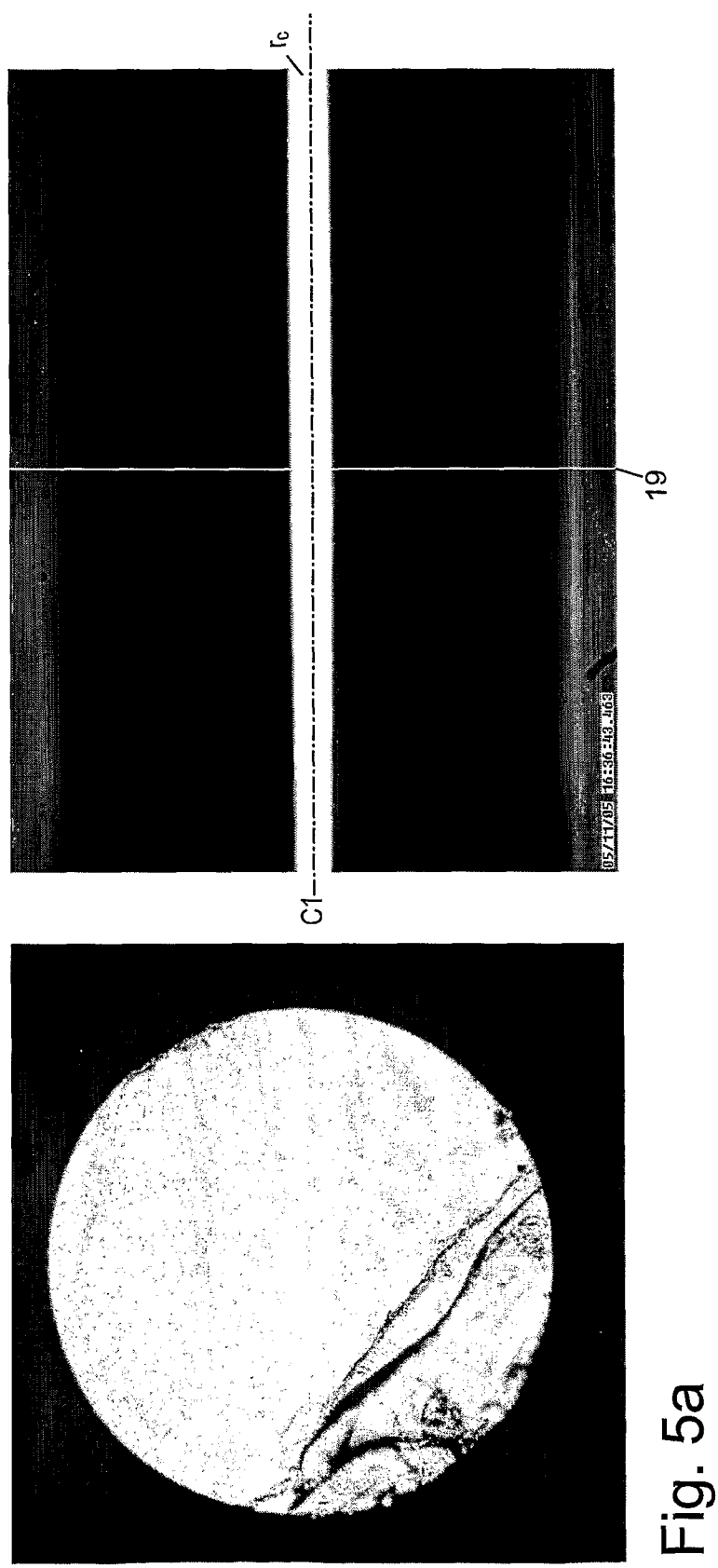

From FIG. 4 it can be derived that for observation planes perpendicular to the observation axis 12 the central composite bright field having three distinct bright fields in the image of the fiber and the three-peak structure in corresponding light intensity profiles can be observed in observation planes located at places where light has passed the core 14' of fiber 13 and that the intensity of the central bright field and the corresponding core image peak, represented by the value of the first parameter H1, increases with increasing the distance of light propagation from the light source. The value of the total contrast H1 reaches its highest value for observation planes at the position indicated by "c" where the central composite bright field degrades into a central field having no distinct inner fields and the three-peak structure in the light intensity profiles degrades into a one-peak structure. This position "c" of the object plane or the observation plane is the so-called "self-focusing position of the fiber". FIGS. 5*a* and 5*b* are pictures taken with the object plane 15 located at the self-focusing positions for a 400 μm round LMA-DCF and a 400 μm octagon Yb-doped LMA-DCF, respectively. It can be seen that very similar images as to the "white-zone", i.e. the central region of the respective picture having a relatively large brightness/high light intensity, are found for these two fibers.

In order to gain some insight into the lens-effect of the fiber and the self focusing effect, the light intensity distribution of the "white-zone" is extracted from FIG. 5*a* and a line 19 indicates the position of the extraction. The light intensity distribution is plotted in FIG. 6. It can be reminded that for the self-focusing effect the refraction of light in the core 14' has no importance and that thus this effect appears also for fibers having no core.

Figure 6:
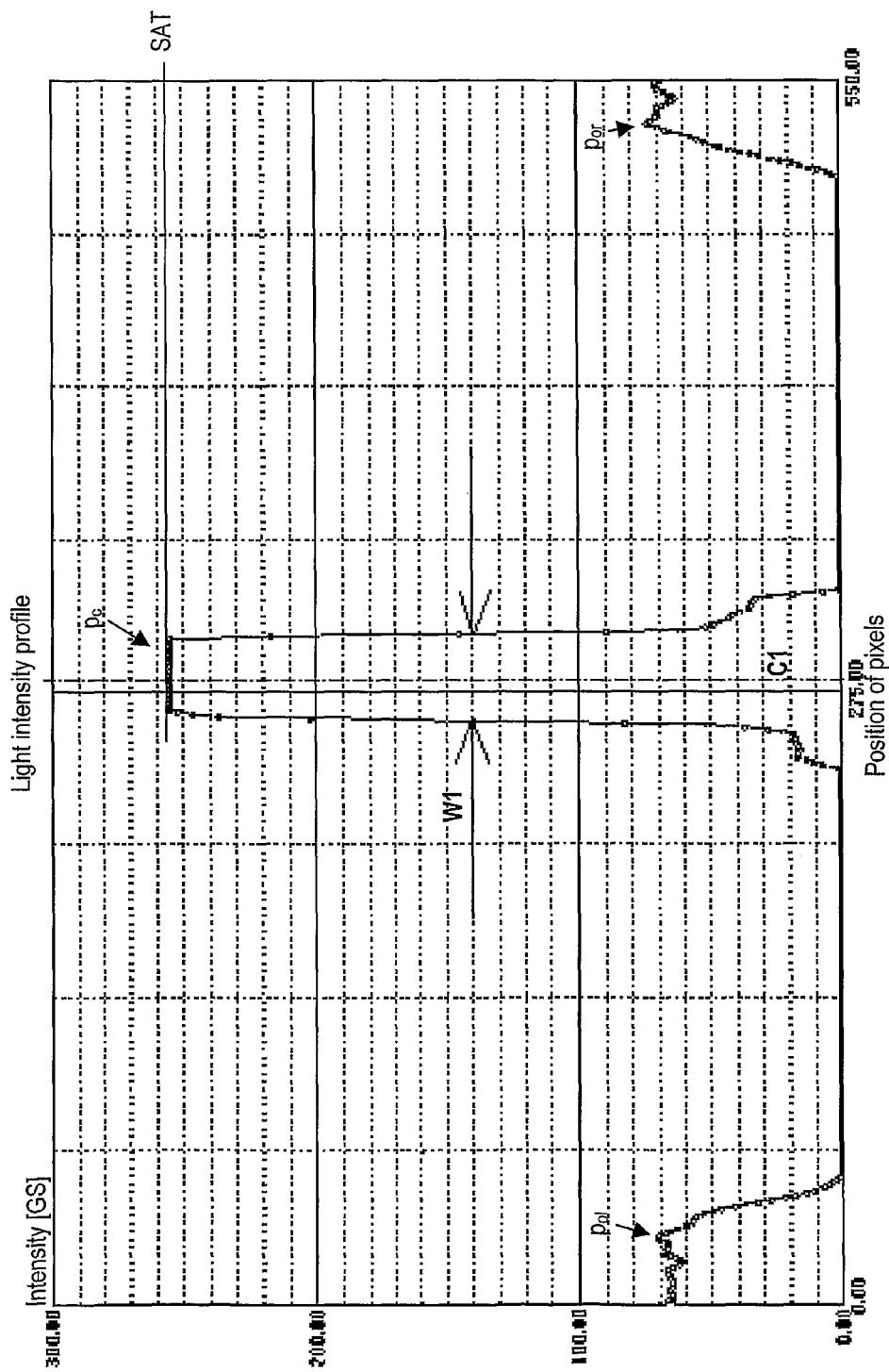
FIG. 6 is a graph of a light intensity profile extracted from FIG. 5a, FIG. 7 is a graph of the first derivative of truncated Gaussian profile of FIG. 6.

It can be observed that in the light intensity profile of FIG. 6 the central peak $c_p$ has similarities to a truncated Gaussian profile. This corresponds to the fact that the central bright region $r_c$ in the image of the fiber, see FIG. 5*a*, has a highest and constant brightness in a field along its center line. A detailed analysis demonstrates that said center line and the center of the truncated profile fit very well to the center of the cladding of the fiber, which can be explained by the high symmetry of the cross-section of the claddings in all commercial optical fibers. Thus, the lens-effect of fiber self-focusing can be used to develop a "quasi-cladding alignment" process without requiring information about the position of cladding edges in captured pictures. This alignment process is the so-called "center-focus alignment".

The concept of "center-focus" was first introduced in the Ericsson FSU975PM-A splicer, cf. FSU975 PM-A, User's Manual, 94ST005R1D, 1998, p. 39. The process was developed to establish a reference position of the imaging system for taking the profile of polarization observation by lens-effect tracing, i.e. the POL profile, cf. the cited U.S. Pat. No.

5,572,313. Herein, the concept of "center-focus" is further developed for use in the process of a center-focus alignment procedure.

To perform the process of "center-focus alignment", the self-focusing position of the considered fiber 13 has to be found. It may be done by evaluating the central bright field for changing positions of the object plane 15 and in particular by carefully analyzing, for such changes, the truncated center profile, e.g. assuming that it is a truncated Gaussian. Since the truncation of the central peak clearly indicates saturation of the imaging system 6 and in particular of the light sensitive device 9, the top portion of the peak having been removed by the saturation effect, the light intensity profile of the truncated structure can thus be easily identified. The truncation or saturation of the observed light intensity or brightness is obviously identical to the fact that the light intensity or brightness in some region is larger than a predetermined value that may be relative high compared e.g. to the contrast values H1, H2 discussed above for the case where a central composite relatively bright field is observed or a three-peak structure in the corresponding light intensity profile.

One way to find the positions in which saturation and truncated structures are obtained is to measure the maximum brightness HM or the maximum value of the light intensity profile and compare it to the saturation threshold SAT of the imaging system 6, e.g. a grey-scale value of 255 in a typical device used for exploring this effect, the saturation threshold then being the relatively high predetermined value mentioned above. It is realized that saturation may occur in a relative wide range near the self-focusing position "c" of the considered fiber. The total contrast value H1 or the corresponding average $H1_{av}$ can obviously be used also for the case where only a single central bright longitudinal field is obtained in images of a fiber end in captured pictures to find a range in which or an object plane position in which a search for a more accurate location of the self-focus plane. The condition for obtaining saturation for the central bright area is then equivalent to the condition H1>SAT where SAT is the saturation level of the image capturing device 9. Obviously SAT is a predetermined quantity and is equivalent to a predetermined threshold value. The condition $H1_{av}$>SAT can also be used or generally HM>$H1_{high}$ (H1>$H1_{high}$ or $H1_{av}$>$H1_{high}$) where $H1_{high}$ is a suitably chosen, relatively high threshold value and $H1_{av}$ is the average relative brightness in the central field.

Generally then, after having set a suitable value of $H1_{high}$, a pre-process for a fast searching of a preliminary object plane position may be started. The searching may start from a well-defined reference position of the object plane, that e.g. may be taken at a location at or at a relatively small distance of the side of the optical fiber end that faces the optical system, said distance being small e.g. in relation to the diameter of the considered fiber end 13. Then, the object plane 15 of the optical system 7 is moved away from the fiber end, pictures are continuously taken, the corresponding HM-values (H1-values or $H1_{th}$-values) are derived by e.g. analysis of intensity profiles derived from the pictures and compared to $H1_{high}$ (SAT). If the condition HM>$H1_{high}$ is found to be fulfilled, the pre-process is terminated and the current position of the object plane is the start position for the next process. Instead of a single position a range for the location of the object plane in which the next procedure for determining the self-focus position will be started or searched may be determined, the object plane positions inside the range all fulfilling the mentioned condition. If e.g. such a range is determined, the start position, also called a first position, for the next procedure may be somewhere inside the range such as in the middle thereof.

Then, in order to get the exact self-focusing position "c", an additional process may be used in which the width W1 of the central bright region $r_c$ in images or equivalently of the central peak $c_p$ in corresponding light intensity profiles is minimized, such a minimum value clearly indicating that the corresponding observation/object plane is the true image plane for the fiber considered as an optical lens. For incoming parallel light this observation/object plane is the focal plane of the cylindrical fiber lens.

The additional process may be started after having first found the region or at least one position of the object plane in which saturation and hence truncated center profiles are obtained, or generally in which the observed light intensity or brightness is larger than the mentioned relatively high predetermined value. Searching the minimum width $W1_{min}$ may then be done by moving the object plane 15 of the imaging system 6 backwards and forwards around a position in which a truncated center profile has been found, continuously taking images during the movement and measuring in real time the width W1 of the truncated center profile. The term "continuously" may herein be taken to mean as conventional that images are taken and analyzed repeatedly with relatively short time intervals or with the object plane moved with relatively small, predetermined steps, i.e. in steps having some predetermined length. If the condition $(W1-W1_{min}) \leq \delta 1$ is fulfilled for a position of the object plane 15, the searching process is terminated, where $\delta 1$ is a predetermined value or predefined constant, also called a threshold value, that may be set to be typically equal to 0.1 μm. The value $W1_{min}$ is usually well defined for an optical fiber of a given type. As has been mentioned above, it is clear that the center C1 of the central bright field $r_c$ and of the truncated center profile $p_c$ approximately represents or indicates the center of the cladding 14 of the fiber, which may be used to perform a "quasi-cladding alignment" of the two optical fibers actually imaged.

Figure 7:
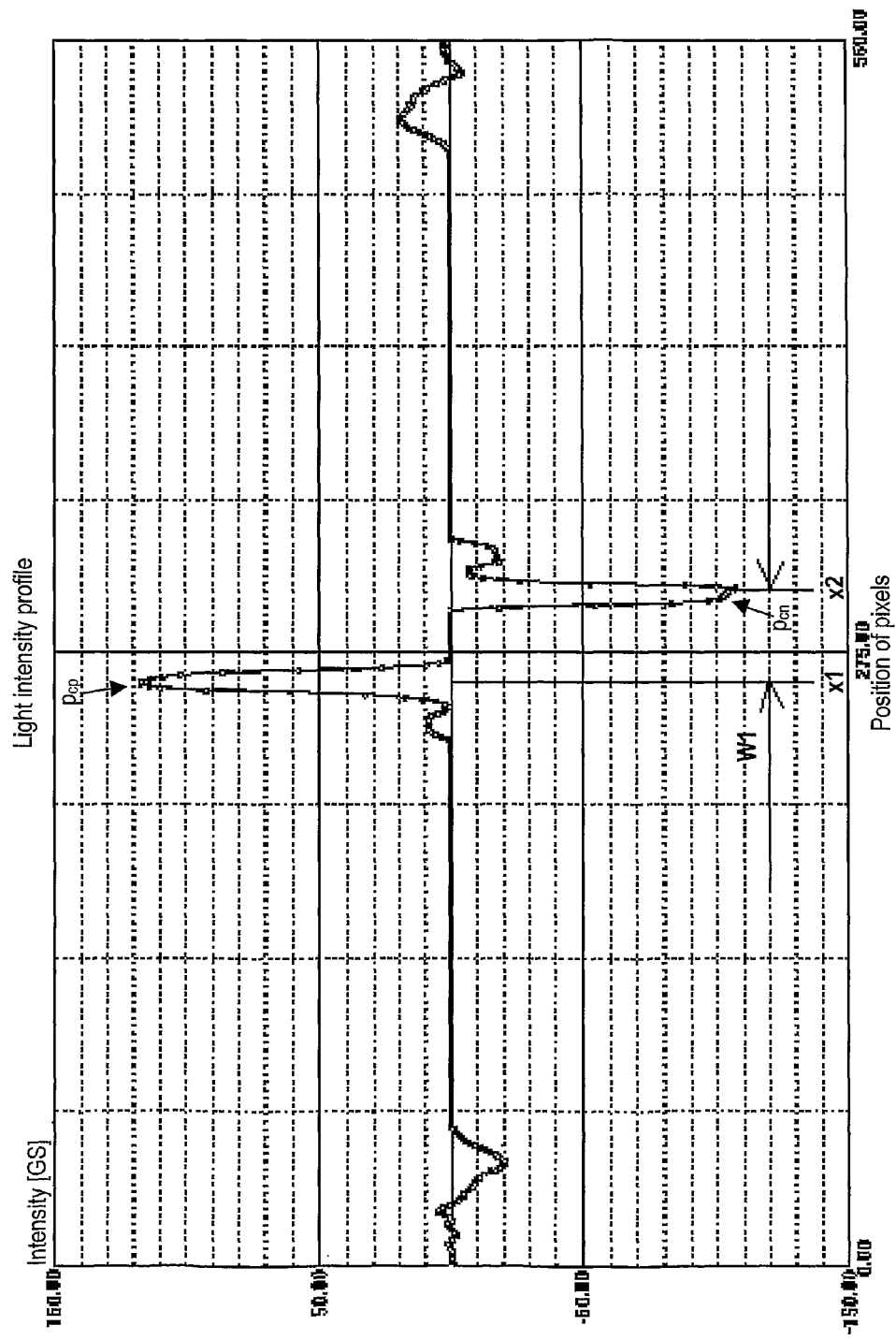

In order to accurately determine both the width W1 and the center C1 of the bright central field/truncated center profile, some suitable method may be used, for a light intensity profile e.g. a method involving analysis of the derivative of the profile. As an example, in FIG. 7 the first derivative of the truncated center profile of FIG. 6 is plotted. It can be seen that two centrally located strong peaks $p_{cp}$, $p_{cn}$ are superposed on noise. The distance between these positive and negative peaks in the plot of FIG. 7 obviously gives a precise measure of the profile width W1. Assuming that the coordinates corresponding to the maximum values of the two peaks $p_{cp}$, $p_{cn}$ are x1 and x2, W1=x2−x1 and the center position of the profile can be simply derived as C1=(x1+x2)/2.

The process of "center-focus alignment" includes the steps that first the position of the center of the cladding 14 which may be taken as the center line of central bright field $r_c$ or the value C1 determined from the corresponding light intensity profile is determined in images of the end of each of the two fiber ends and that finally the two fiber ends are aligned using the determined positions of the centers. The process is very useful in many aspects. Due to the maturity in manufacturing processes, most of fiber manufacturers nowadays produce fibers of a high quality, e.g. SMF fibers having a non-circularity smaller than 1% and an eccentricity smaller than 0.2 μm. The eccentricity refers to the finite tolerance in fiber manufacturing processes in which the core of a fiber is not perfectly centered with respect to the cladding of the fiber, i.e. more accurately with respect to the outer surface of the cladding. Experimental data show that, for fibers having a small non-circularity and a small eccentricity, it would make no difference in regard of splice losses whether the process called "center-focus alignment" or the process called "core alignment" is used. Therefore, the process of "center-focus alignment" can in principle be used to replace the process of real core alignment to align fibers of high quality.

Furthermore, in addition to using the process of center-focus alignment for e.g. standard single mode optical fibers, it can also be used to perform an alignment for large diameter fibers (LDFs). The term LDFs refers to fibers having cladding diameters larger than 300 μm, typically in the range of 300-1000 μm, compared to standard SMFs having a diameter of 125 μm. Using a standard imaging system in a conventional optical fiber splicer, fiber edges of many LDFs cannot be observed due to the limited size, in particular the limited height, of the image capturing device or light sensitive sensor 9. On the other hand, it can be noticed that the width W1 of the central truncated peak or of the central bright field in the self-focusing region is typically a factor 5-10 smaller than the width of the cladding diameter in the captured pictures, see FIGS. 5a and 5b, which implies that, using the method of center-focus alignment, alignment can be performed without requiring an advanced imaging system having an image sensor of relatively large dimensions, in particular in the height direction for conventional orientations of fibers and pictures of fibers, and/or an optical system having a zoom function. Thus, the center-focus alignment is a cost effective solution for aligning LDFs in fusion splicers.

However, it has to be observed that due to primarily technical reasons and the rather complicated processes in manufacturing LMA-DCFs it is still difficult to manufacture LMA-DCFs of a high quality. For instance, the typical eccentricity of an LMA-DCF is usually about 1-2 μm, which is a factor 5 larger than that of conventional SMFs. For fibers of such a large eccentricity, the quality of splices is not consistent when using methods based on aligning the claddings. This results from the fact that the core offset varies randomly, depending on the azimuthal orientation of the fibers to be spliced to each other. For instance, assuming a perfect alignment of the claddings of two fibers having the same eccentricity of 2 μm, the final core offset in the splice can vary between 0 and 4 μm. The variation of the initial core offset results in a corresponding significant variation of splice loss from one splice to another.

Hence, core alignment can improve splices for LMA-DCFs and possibly also other optical fibers having a large eccentricity. However, it is well known that, for normal or conventional SMFs, core alignment does not guarantee low splice losses for fibers having a large eccentricity. Due to the effect of eccentricity, an axial offset or lateral offset, also called transverse offset, between the cladding surfaces of the fibers to be spliced appears when the cores of the two fibers are accurately aligned with each other. During the fusion process, the fibers intend to minimize the axial offset due to the viscous self-centering effect of molten material, typically some glass, i.e. the so-called surface-tension effect. Finally hence, the cores that are pre-aligned before to the actual fusion process will be misaligned after the fusion process has been completed, and the cores of the spliced fibers can even be bent at the splice point, this in turn resulting in high splice losses.

In contrast to standard SMFs, experiments show that the surface tension effect may be negligible for splices between most LDFs and/or for splices between combinations of LDFs and fibers of other types. Taking the combination of a 600 μm LDF and a conventional 125 μm SMF as an example, the effect of viscous self centering would be almost cancelled due to the equilibrium of surface tension, taken azimuthally. For splicing two LDFs to each other, it has also been found that the effect of surface tension is much smaller compared to that for two SMFs due to the relatively huge mass or volume of LDFs, compared to e.g. standard SMFs. Also, the relatively huge mass or volume of LDFs prevents the bending of the cores of the fibers spliced to each other. Therefore, core alignment could significantly improve splice results for LDFs having large eccentricities.

With the arguments given above, though the process of center-focus alignment may not be suitable for LMA-DCFs having a large eccentricity, it can however at least serve as a pre-alignment process for developing an advanced core alignment process for LMA-DCFs. The process of center-focus alignment as described above can approximately position the LMA-DCFs with a relatively small core offset in relation to each other. It implies that the analyzing range for finding the core image could be significantly reduced without knowing the position of the cladding edges in the pictures taken. A core-alignment process, based on this fact, that is particularly suitable for LMA-DCFs but also applicable to fibers of other types, not requiring the use of a complicated and advanced imaging system, will now be described.

Figure 8:
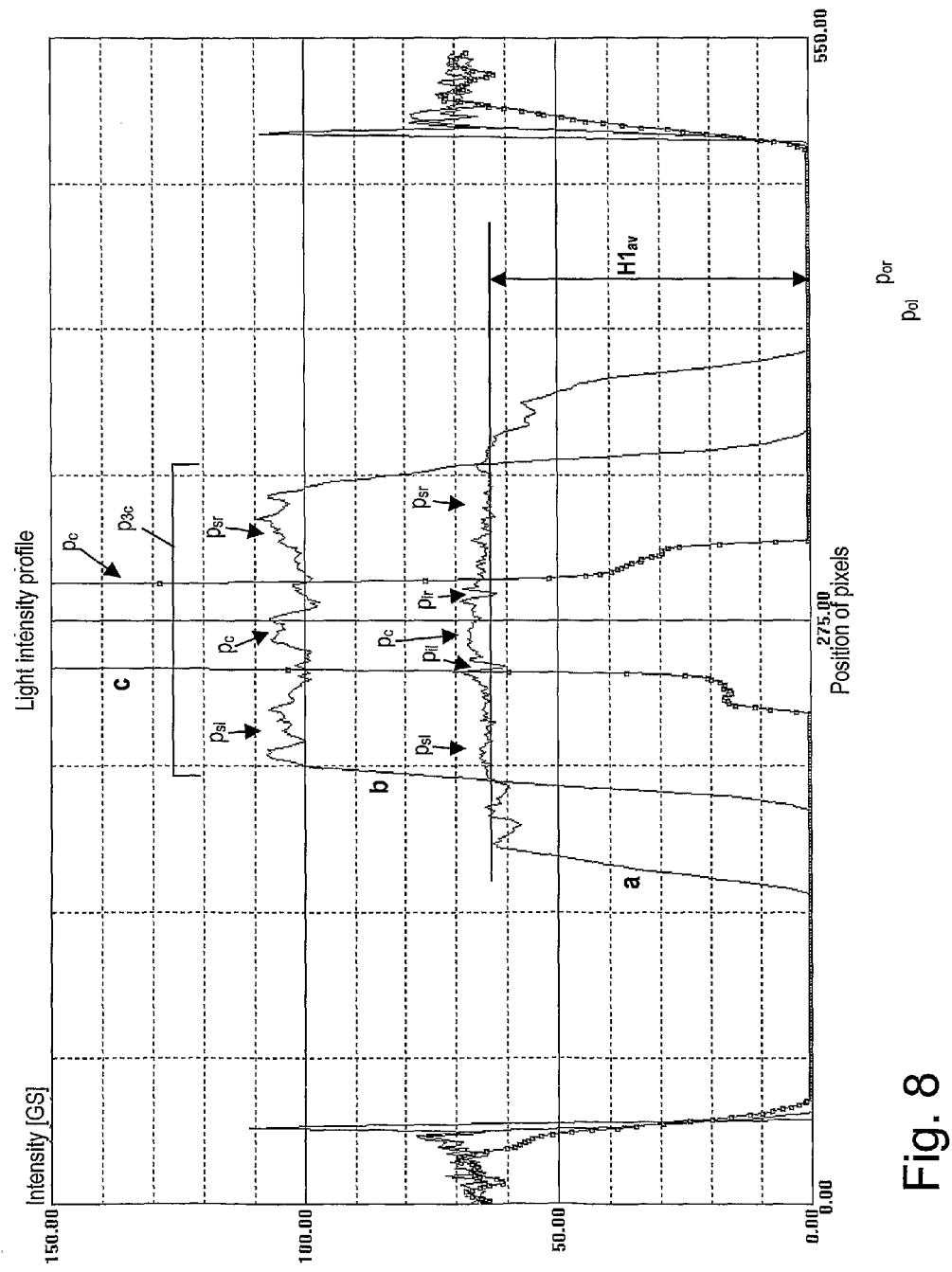
FIG. 8 is a graph of light intensity profiles determined for a 400 μm octagon LMA-DCF.

Hence, first a procedure for rapidly finding the core image of the considered fiber will be described. In FIG. 8, light intensity profiles extracted for pictures taken with the object plane 15 at positions "a", "b" and "c" as indicated in FIG. 4 for a 400 μm octagon LMA-DCF are plotted. The corresponding images have been obtained by orienting the octagon fiber so that the symmetry axis of the fiber is "matched" to the optical axis 12 of the imaging system 6. It means that the collimated light perpendicularly hits one of the flat surfaces of the octagon shape.

From FIG. 8, the profile c is characterized by "saturation" in the central peak $p_c$ and is immediately identified, this profile taken with the object plane at the position "c" for "fiber self-focusing". The profile b is taken with the object at position "b" where the core image is well resolved so that the central three-peak structure $p_{3c}$ can be observed though the cladding peaks $p_{sl}$, $p_{sr}$ suffer from a high level of "noise". The profile a is taken with the object plane at position "a" where the profile is centrally quite flat. However, the core image $p_c$ is still well resolved and is characterized by two inverted peaks $p_{il}$, $p_{ir}$ with the "minimum intensities". It has been observed that in the splicer device used for testing, the upper and lower limits to get the central three-peak structure are of about H1=120 and H1=60 grey scale levels, respectively, i.e. there are for each fiber and apparatus or device definite upper and lower limits for the intensity of the central peak between which the central three-peak shape $p_{3c}$ can be clearly distinguished and thus analyzed. Detailed studies show that, for fibers of a given type and well-defined settings of the imaging system 6, the corresponding upper and lower limits are almost the same. Thus, it is possible to create a threshold value $H1_{th}$ for rapidly finding the three-peak structure. It can reminded that the center three-peak structure is equivalent to having, in the image of the fiber, a central composite bright field containing a central bright field associated with the core 14' of the fiber and surrounding bright fields.

A suitable value of the threshold $H1_{th}$ can be defined as the average value of the upper and lower limits of the range in which the three-peak structure is well resolved and it should generally be smaller than or preferably significantly smaller than the saturation level SAT, or equivalently compared to $H1_{high}$, of the image capturing sensor 9 used. Taking the 400 μm octagon LMA-DCF as an example, the upper and lower limits are 60 and 120 grey scales, respectively, as mentioned above. Thus, the suitable threshold could be set to $H1_{th}$=90 grey scale levels. The threshold values for fibers of different types can be experimentally determined and/or be determined by educated guesses. For instance, according to the basic mechanism of core-image formation, see FIG. 4, a reasonable position for setting the object plane 15 of the imaging system 6 to obtain $H1_{th}$ is near the side or surface of the cladding 14 where light leaves the fiber 13.

The next question is how to define the fact that an intensity profile has a well-resolved three-peak structure. By taking the noise level of the imaging system, that in the apparatus actually used for the tests can be taken be e.g. around 2 grey scales, into account, the well-resolved three-peak structure may be usually defined by a minimum accepted value $H2_{min}$ of the local core-peak contrast H2. The value $H2_{min}$ may typically be set to be a factor 2 higher than that of the noise level, i.e. $H2_{min}$ can be set to 4 grey scale levels in the example given and generally the value of $H2_{min}$ should not be smaller than this value.

After having determined a suitable value of $H1_{th}$, a preprocess for a fast searching of an object plane position giving the three-peak structure in captured pictures may be started. The searching may start from a well-defined reference position of the object plane, that e.g. may be taken as the self-focusing plane of the considered optical fiber end 13 or generally at a location remote of or at relatively large distance of the side of the optical fiber end that faces the optical system. After finding such an initial position such as the self-focusing plane, the object plane 15 of the optical system 7 is moved towards the core 14' of the fiber 13, pictures are continuously taken, the corresponding H1-values are extracted by real-time analysis of the intensity profiles and compared to $H1_{th}$. If the condition $H1 \leq H1_{th}$ is found to be fulfilled, the pre-process is terminated and the current position of the object plane is the start position for the next process.

It is obvious that instead of using the total contrast H1 as defined above in the search, instead an average total contrast $H1_{av}$ may be used, the average total contrast defined as the difference between average brightness in the central composite bright field $r_{3c}$ and the brightness in the adjacent black regions $r_{bl}$, $r_{br}$ in captured pictures or equivalently between the average light intensity in the central three-peak structure $p_{3c}$ and the light intensity in the adjacent black areas $b_l$, $b_r$ in the intensity profiles derived from the captured pictures. It is also obvious that instead of the defined condition a general condition of the type $|H1-H1_{th}| \leq \delta 6$ or $(H1_{th}-H1) \leq \delta 6$ may be used where $\delta 6$ is a suitably chosen, relatively small predetermined value to select a position of or range for object plane at/in which the next procedure for determining a best position will be started or searched. If e.g. such a range is determined, the start position for the next procedure may be somewhere inside the range such as in the middle thereof.

Then, the best position for determining the position of the core 14' in the pictures taken will be determined. It is clear that the best object plane position for the imaging system 6 to give pictures from which the position of the core 14' can be determined is the position in which the local core-contrast H2 has its highest value $H2_{max}$, since, at the object plane position for $H2_{max}$, the best resolved structure of the core-image peak is obtained. To find the object plane position giving the value $H2_{max}$, the value of the local core contrast H2 can be maximized by moving the object plane 15 backwards and forwards around the position in which the total core-peak contrast in the pictures taken is approximately equal to $H1_{th}$. If the condition $(H2_{max}-H2) \leq \delta 2$ for an object plane position is fulfilled, the process is terminated, where the constant $\delta 2$ is a predetermined value or pre-defined constant, typically 1-2 grey scales in the apparatus used for testing the method. The value of $H2_{max}$ can be derived experimentally.

Many advantages are obtained by using the local core contrast H2 for finding the best object plane position for determining the position of the image of the core 14' in pictures taken. First, using methods of the prior art, such as disclosed e.g. in the cited published Japanese patent application 11194227 and in the published Japanese patent application 1114853, the position for observing the core of a given fiber is fixed. Due to the finite tolerance in manufacturing components in the imaging system, e.g. optical lenses, the best focusing or object plane position may significantly vary from one system to the other, resulting in variation of the image quality from one splicer to the other. To overcome this problem, a rigorous checking of the tolerances of optical components is necessary, which significantly increases manufacturing costs. Using the process as described herein, the best position for observing the core of a fiber is dynamically determined and optimized for the individual imaging system 6. Thus, the demands on the manufacture of the optical lenses could be reduced. Second, at the object plane position for obtaining $H2_{max}$ the core-image is well separated/resolved from the two side "cladding peaks". Thus, the negative contributions of the cladding peaks to the core peak are minimized in this position, such negative contributions e.g. including a micro-shift of the core peak $p_c$ due to superposition of the intensities of core peak and the cladding-image peaks $p_{sl}$, $p_{sr}$ on each other. Finally, the process gives a possibility to perform core alignment without requiring information on the position of cladding edges in the pictures taken.

It can be again reminded that light intensities as recorded in a light intensity profile are equivalent to brightness values of corresponding fields in the picture from which the light intensity profile is derived. In particular maximum light intensities are equivalent to maximum brightness values and minimum light intensities are equivalent to minimum brightness values.

A direct alignment method using a cascade procedure will now be described.

After having determined a suitable position/suitable positions for imaging the fiber ends, such as after having found the best object plane positions or focusing positions, as described above, the transverse offset between the two fiber ends in the respective view may be determined. Then the imaging system 6 is first set for capturing a suitable picture of one of two fiber ends to be first aligned and then spliced to each other, e.g. the left fiber end. In such a picture usually images of both fiber ends can be seen. Specifically, the image of the core 14' of the fiber or alternatively, the image of a center line, originating from refraction in the cladding 14, in the picture, see the description hereinafter, may be observed. Then the setting of imaging system 6 is changed, if required, to make it take a suitable position for capturing a picture of the other of the two fiber ends. In the suitable picture for observing the other fiber end the image of the core or the center line of the other fiber end is observed. From these observations the transverse offset is determined.

Hence generally, the transverse offset may e.g. be determined from positions of the cores of the two fibers, in particular of the centers of the cores, in the picture or from positions of the center lines mentioned above. The position of a core 14' or of a center line in a picture may in turn be obtained from a single point in the image of the core or center line, such a single point then located at a suitable, relatively small distance from the image of the end surface of the fiber. The offset as observed by the imaging system is finally determined from the difference between obtained positions in the transverse direction.

Alternatively, to achieve a higher accuracy, the position of a core or center line may be obtained from determined positions of a plurality a points taken in the image of the core or center line, such points e.g. having a suitably chosen constant spacing and located at increasing distances from the image of the end surface, the point closest to the image of the end surface also then located at a suitable, relatively small distance from the image of the end surface of the fiber. The determined positions of the points, in the transverse direction, may then be fitted to a straight line by a suitable method, e.g. some standard method as the method of "linear regression fitting".

After having determined such straight lines for both fiber ends, the two straight lines are extended up to the splice point or more accurately, up to the plane where the splice is intended to be made, this plane being an intended splice line in the pictures. From the intersections of the straight lines with the splice line, the transverse core offset in the pictures taken can be determined, such as by forming the distance or difference between the intersections points.

The process of using a plurality of determined points for each fiber end to find an offset or distance is schematically illustrated in FIG. 9.

In particular, the position of a core 14' or of a center line may be determined from a single intensity profile located at a suitable, relatively small distance from the image of the end surface of the fiber. However, in the same way as described above, it may give a higher accuracy to determine the position of the core or center line from a plurality of intensity profiles, taken at lines located at increasing distances of the image of the end surface. Hence, many samples of intensity profiles along the fiber end may be taken, e.g. 20 samples with an interval of 5 μm from the image of the end surface, also called cleave end, of the considered fiber. Then, the center position of the core peak or the central peak for each sample intensity profile is determined. Methods for determining the center position of the core peak or generally of a central peak will be discussed below. These center positions may as above be fitted to a straight line by a suitable method, e.g. some standard method as the method of "linear regression fitting".

In a fusion splicer the two fibers are usually watched or imaged in two viewing planes, herein taken as perpendicular to X- and Y-viewing directions, that in most cases are perpendicular to each other but in some devices may have another angle to each other. In any case, the viewing directions are perpendicular to and the viewing planes are parallel to the longitudinal direction of the parallel fiber ends positioned and clamped in the device, this longitudinal direction taken as the Z-direction. From the offsets $\Delta X$, $\Delta Y$ determined in the pictures taken, the real or actual physical offsets DX, DY can be calculated from the magnification of the optical system 7. The offset DX is the offset seen in the viewing direction X and the offset DY is the offset seen in the viewing direction Y.

In order to obtain a reliable or sufficiently good value of the distance DZ between the end surfaces of the two fibers to be spliced, the images of the end surfaces, in suitable ones of the pictures taken, may similarly be fitted to two straight lines, using e.g. the method of linear regression. Then the average distance between the two straight lines is determined or calculated, this distance taken to be the distance between end surfaces in the pictures taken. From this distance $\Delta Z$ determined in the pictures, the real or actual offset DZ between the end surfaces in the Z-direction can be calculated as above, using the magnification of the optical system 6.

The alignment process is straightforward. The longitudinal offset DZ between the end surfaces of the two fibers in the Z-direction, that extends in parallel to the longitudinal direction of the clamped fiber ends, is first adjusted to obtain approximately the value of a well defined gap distance DG within a pre-defined threshold $\delta 3$. Then the offset DX or DY as seen in a first one of the transverse viewing directions, is minimized by activating accordingly the motor 33 for moving the respective fiber fixture 31 parallel to this viewing plane, see the detailed description of FIGS. 11a and 11b below, and hence the fiber end held by the fixture is moved in the same plane. This movement can be made using e.g. a constant step having a value, that then should be very small, i.e. the reduction of the respective offset as appearing from a picture captured after taking one step should be small or very small in relation to the transverse dimension of the fiber image in the captured picture.

For speeding up the alignment processes, a special method can be used that is called a "cascade technique". The cascade technique refers to the use of a special algorithm for reducing the offsets in the Z-direction and as observed in the X-, Y-directions. This algorithm includes using steps of successively smaller values when the respective fixture 31 and fiber end, all of the steps taken in the same direction for reducing the offset to a smallest possible value. Such successively smaller values may in one example be taken according to an exponentially decaying function, but other decaying functions can be used, the actual function used chosen e.g. depending on the required speed until the offset is minimized. In practice, is has been found that an algorithm using a half-step cascade to reduce the offset may in some cases be a good choice.

Hence, in this method, the offset in the picture after each step is determined, then it is determined if the offset, or the corresponding physical offset between the fiber ends, has been sufficiently minimized, i.e. is smaller than a predetermined value $\delta 4$ or $\delta 5$ for the offsets $\Delta X$ or $\Delta Y$, respectively, and then moving the fixture 31 by a new step having a value calculated to reduce the now determined offset to half its value. When the offset is smaller than the predefined value, the process for alignment in the considered viewing direction is terminated. Thereafter, the same process is executed for the other viewing direction. Finally, if required, a picture can be captured in the first viewing direction to check that the offset as determined therein still is sufficiently small. If it is not smaller the process for aligning in that viewing direction can be continued to obtain the required alignment quality. After all alignment sub-processes have been performed, the fibers can be spliced to each other. The constants $\delta 4$ and $\delta 5$ are determined by the accuracy of the mechanical system. Typical values of these two constants are 0.1 μm for the physical offsets or the corresponding values calculated for offsets in the captured pictures, obtained from the magnification of the optical system 7 and, for digital imaging, the density of pixels in captured pictures. A similar method may also be applied to setting the longitudinal offset DZ to the desired value DG.

The procedure for aligning or positioning in one view or in one direction according to the cascade method includes the following steps:

1. Move one of the two fiber ends to an initial position in relation to the other fiber end, that e.g. may be taken to be stationary, so that, in the movement to this initial position, the play of the mechanical system has been absorbed, and so that the fiber end has to be moved in same movement direction, that was used for absorbing the play, in order to minimize the offset or make the offset take a predetermined value.
2. Capture a picture of the fiber ends in this position and determine the considered offset or distance $\Delta_1$ in the picture.
3. Determine whether the determined offset or distance deviates from the desired value by an amount smaller than the predetermined value, also called a predetermined quality value, and terminate the procedure if smaller.
4. Calculate a displacement step that corresponds to an offset or distance that is smaller than the offset or distance in the picture determined in the previous step 2.
5. Move the fiber a distance corresponding to the calculated displacement step in the same movement direction as in step 1.
6. Capture a picture of the fiber ends in this position and determine the considered offset or distance $\Delta_2$ in the picture.
7. Determine whether the determined offset or distance deviates from the desired value by an amount smaller than the predetermined quality value and terminate the procedure if smaller.
8. Calculate new displacement step that corresponds to an offset or distance that is smaller than the offset or distance in the picture determined in the previous step 6.
9. Repeat steps 5-8 until terminated in step 7.

In steps 4 and 8 the displacement steps $s_1, s_2, \ldots$ are calculated according to $s_j = a_j \cdot \Delta_j$, $j=1, 2, \ldots$ where the constants $a_1, a_2, \ldots$ are positive values, all smaller than one, e.g. $a_j = 3/4, j=1, 2, \ldots$. It may generally be a good choice to set all the constants to a small value, e.g. smaller than $1/4$, if the precision of the mechanical movement system is very low and in other cases all the constants may be set to a larger value, e.g. larger than $1/3$ and often the value $1/2$ can be a good choice. The constants $a_1, a_2, \ldots$ can in an alternative be dependent on the actual or real offset between the fiber ends in the considered viewing direction, so that e.g. for large real offsets the constants have larger values but for smaller real offsets they have smaller values, this giving in some cases an accurate, rapid alignment without risking that the actual real movement of fibers will "overshoot", i.e. that the fibers are moved a too long distance so that they have to be displaced in the opposite direction to reduce the offset to the predetermined value. The constants $a_1, a_2, \ldots$ can in this case be exponentially dependent on the real offset decreasing from larger values for large offsets to smaller values for smaller offsets. Alternatively, the constants $a_1, a_2, \ldots$ can have a large fixed value, e.g. $3/4$, for offsets larger than a threshold value, and smaller fixed value, e.g. $1/2$, for offset smaller than or equal to the threshold value.

In order to accurately determine the position C2 of the center of the core-image peak in the light intensity profile, and also, if required, to determine the position of the single central peak in the center-focus method, a curve fitting process, the so-called Chi-Square ($\chi^2$) fitting, can be used, see the above cited International patent application No. WO 01/86331. In this method, it is assumed that the measured profile, within a selected interval, can be modeled by a superposition of analytic functions plus a noise background. The quality of curve fitting can be evaluated by a reduced Chi-Square-($\chi^2$)-function. The reduced ($\chi^2$)-function can be written as:

$$\chi^2 = \frac{1}{N-\mu} \sum_{i=1}^{N} \left( \frac{F_i(x_i) - \sum_{j=1}^{n} G(x_{i,j}; a_{i,j}) - C}{\Delta F_i} \right)^2 \quad (1)$$

where $G(x_{i,j}; a_{i,j})$ is the j-th analytic function with fitting parameters $a_{i,j}$, $F_i(x_i)$ is the i-th measured intensity of the core-image peak at the position $x_i$ with a measurement error-bar $\Delta F_i$. Here, the error-bar $\Delta F_i$ is estimated by the standard deviation, i.e. $\Delta F_i \approx \sqrt{F_i(x_i)}$. N is the total number of measurement points at $x_i$. C is a noise background of the image system and is assumed to be a variable constant. $\mu$ is the number of fitting parameters varied during the fitting procedure. The integer n is the number of independent analytic functions used in the fitting procedure, In the profile analysis, the Gaussian function may be a suitable analytic function to be used for modeling the profile where the core-image peak is located. Thus, the equation (1) can be reduced to:

$$\chi^2 = \frac{1}{N-\mu} \sum_{i=1}^{N} \left( \frac{F_i(x_i) - G(x_i; a_1; a_2) - C}{\Delta F_i} \right)^2 \quad (2)$$

where $G(x_i; a_1; a_2)$ is the Gaussian function with fitting parameters $a_1$ and $a_2$. The parameters $a_1$ and $a_2$ stand for the expected center position of the highest peak in the profile and the full width to half maximum (FWHM) of the peak, respectively. The best set of fitting parameters $\{a_{1,best}; a_{2,best}; C\}$ are those that maximize the probability of representing the measured data. In practice, the fitting parameters giving a result of $\chi^2 \approx 1$ is searched for. By varying the fitting parameters using well-defined fitting loops and calculating the corresponding value of $\chi^2$, the value $\chi^2 \approx 1$ for the best fitting values of $\{a_{1,best}; a_{2,best}; C\}$ for representing the core-image peak is found. Thus, the position of the core-image peak is given by $a_{1,best}$. The initial values $\{a_{1,0}; a_{2,0}; C\}$ for the fitting parameters are determined by a pre-analysis of the images, and e.g. the following values can be used: $a_{1,0} = x_i \{Max(F_i)\}$, $a_{2,0} = 2\{a_{1,0} - x_k[Max(F_i)/2]\}$, $C = Min\{F(x_i)\}$.

For better statistics, a number of images (m) might be taken for each position $x_i$. If it is assumed that the corresponding intensity for each individual image is $h_{i,l}(x_i)$, $l=1, 2, \ldots, m$, the values $F_i(x_i)$ will be determined by averaging the measured intensity obtained from the images, that is:

$$F_i(x_i) = \frac{1}{m} \sum_{l=1}^{m} h_{i,l}(x_i) \quad (3)$$

However, it has to be emphasized that, according to basic mathematics, the light contrast profile can in principle be represented by a set of elementary functions, such as quadratic, polynomial, logarithmic, exponential, etc. The selection of analytic functions to be used depends mainly on the alignment accuracy and the time for executing the model calculations, Therefore, for a fiber of a given type, any functions fulfilling the demands on well-defined alignment accuracy and time should be considered as suitable functions for model calculations. A typical example is the quadratic function that has in practice been successfully used for fast analyzing and determining the center of the core peak.

For two fiber ends to be spliced having the same cladding diameter and for two fiber ends to be spliced having cladding diameters which differ from each other by only a relatively small difference or by a relatively large difference the alignment processes may be performed in different ways in order to finish some of the processes faster or to simplify the processes. It is generally obvious that if the "best" alignment positions as defined above for the two fibers in the respective process are sufficiently close to each other, it may be possible to use for the alignment procedure a single object plane position and pictures captured for this object plane position. This single object plane position may then in some way be derived from the determined alignment positions, such as being the mean thereof, or even being the alignment position for one of the two fiber ends, this case thus requiring only the search for a the alignment position for one fiber end. Otherwise, separate pictures may have to be captured for each of the alignment positions and evaluated.

Figure 13A:
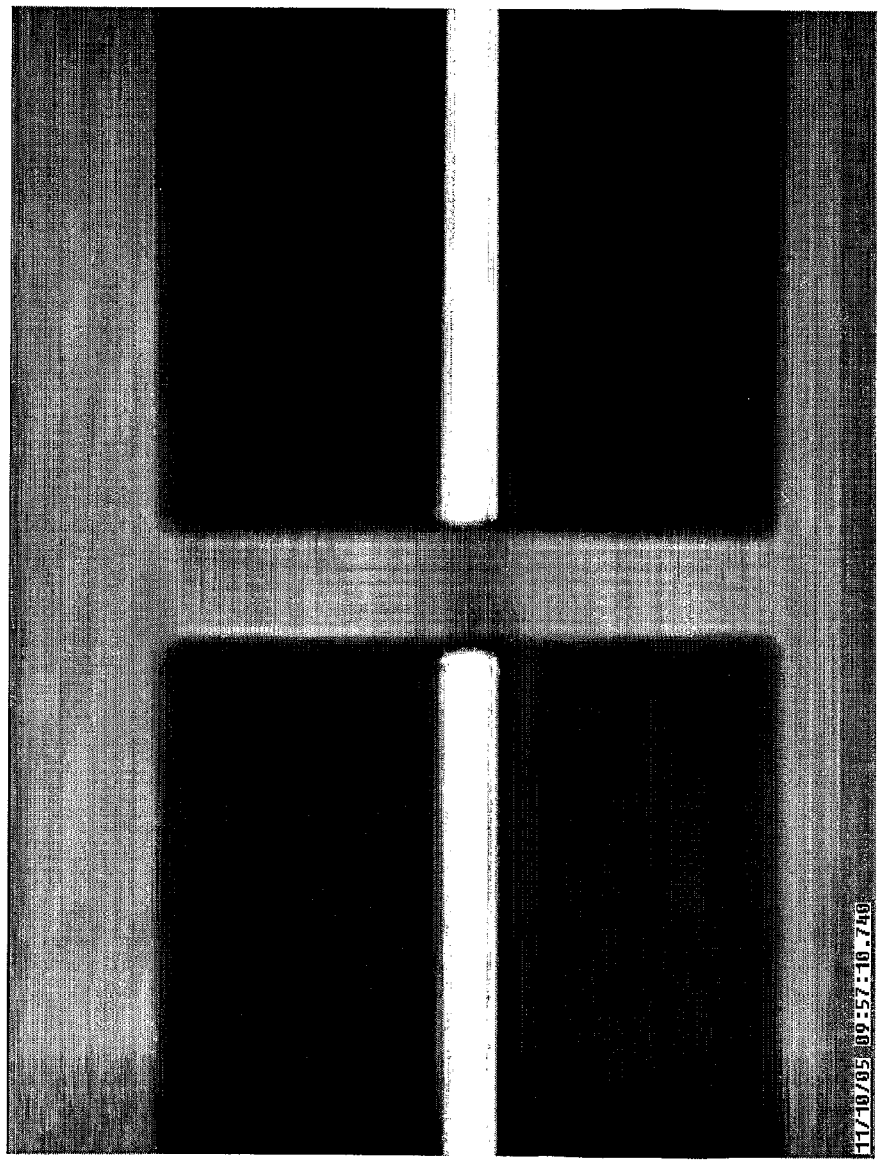
FIG. 13a is a photograph or picture, as captured by the imaging system of a fiber splicer, of two fiber ends to be spliced to each other, using the best setting of the imaging system for the left fiber end to perform a center-focus alignment operation.
Figure 13B:
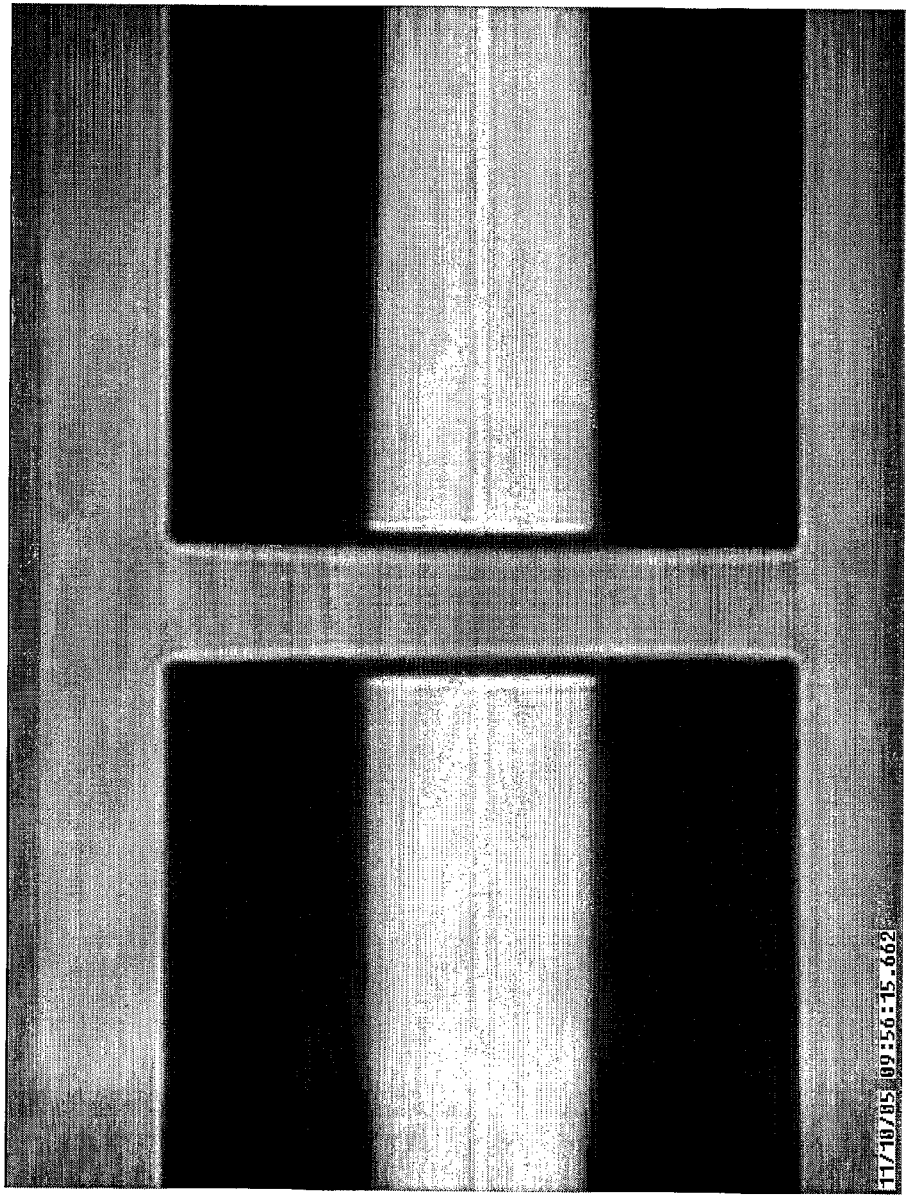
FIG. 13b is a photograph or picture, as captured by the imaging system of a fiber splicer, of two fiber ends to be spliced to each other, using the best setting of the imaging system for the left fiber end to perform a core alignment operation.

The following three cases may be considered for the core alignment method but the same cases may be applicable also to the center-focus method:

(a) If the cladding diameters of the fibers to be spliced are the same, it is possible to obtain the same quality of core images of the two fibers even if only one fiber is used for searching the core image. In practice, it may be done by dynamically searching, in the considered viewing direction, for the object plane position that gives the best quality of the core image for the fiber end that is moved, this fiber end then moved in a plane perpendicular to the considered viewing direction. In the photographs of FIGS. 13a and 13b such a best position is used for the left fiber end for the center-focus case and the core-focus case, respectively. It appears that the object plane positions used give pictures that are sufficiently good for performing the respective type of alignment.

Figure 14A:
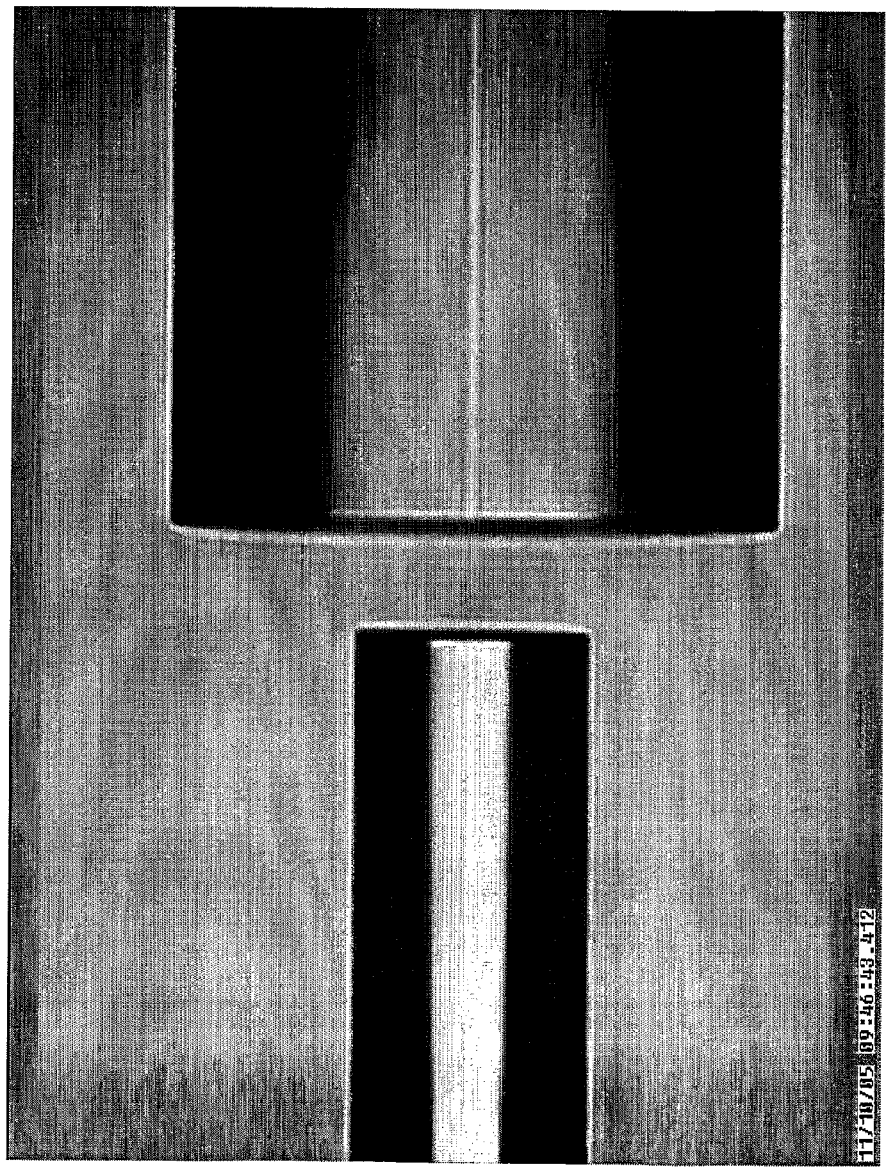
FIG. 14a is a photograph or picture, as captured by the imaging system of a fiber splicer, of the ends of two optical fibers having different diameters to be spliced to each other, using the best setting of the imaging system for the left, thinner fiber end for performing a core alignment operation.

(b) If the difference between the cladding diameters of the fibers to be spliced is relatively small, e.g. in the range of 10-50% or even in the range of 10-100% of the diameter of the thinner fiber, it may be sufficient to use the best position of the object plane for only the thinner fiber when making the alignment. For core alignment, it is understood that the image of the thicker fiber then may not have an optimum quality but, in most cases, the quality may be acceptable for making an accurate alignment, see the photograph of FIG. 14a, where the difference between the cladding diameters is actually 150% of the diameter of the thinner fiber. However, the best object plane position for the thicker fiber cannot be used since, if that object plane would be used, it would not be possible to observe the core 14' of the thinner fiber, see the photograph of FIG. 14b, because the lens effect of the thinner fiber dominates. The advantage of using the image of only one fiber end for the alignment is obviously that the alignment processes can be made more rapidly, requiring a shorter total time period, in this case for the core-alignment processes. The same is obviously also true for center-focus alignment processes.

Figure 15A:
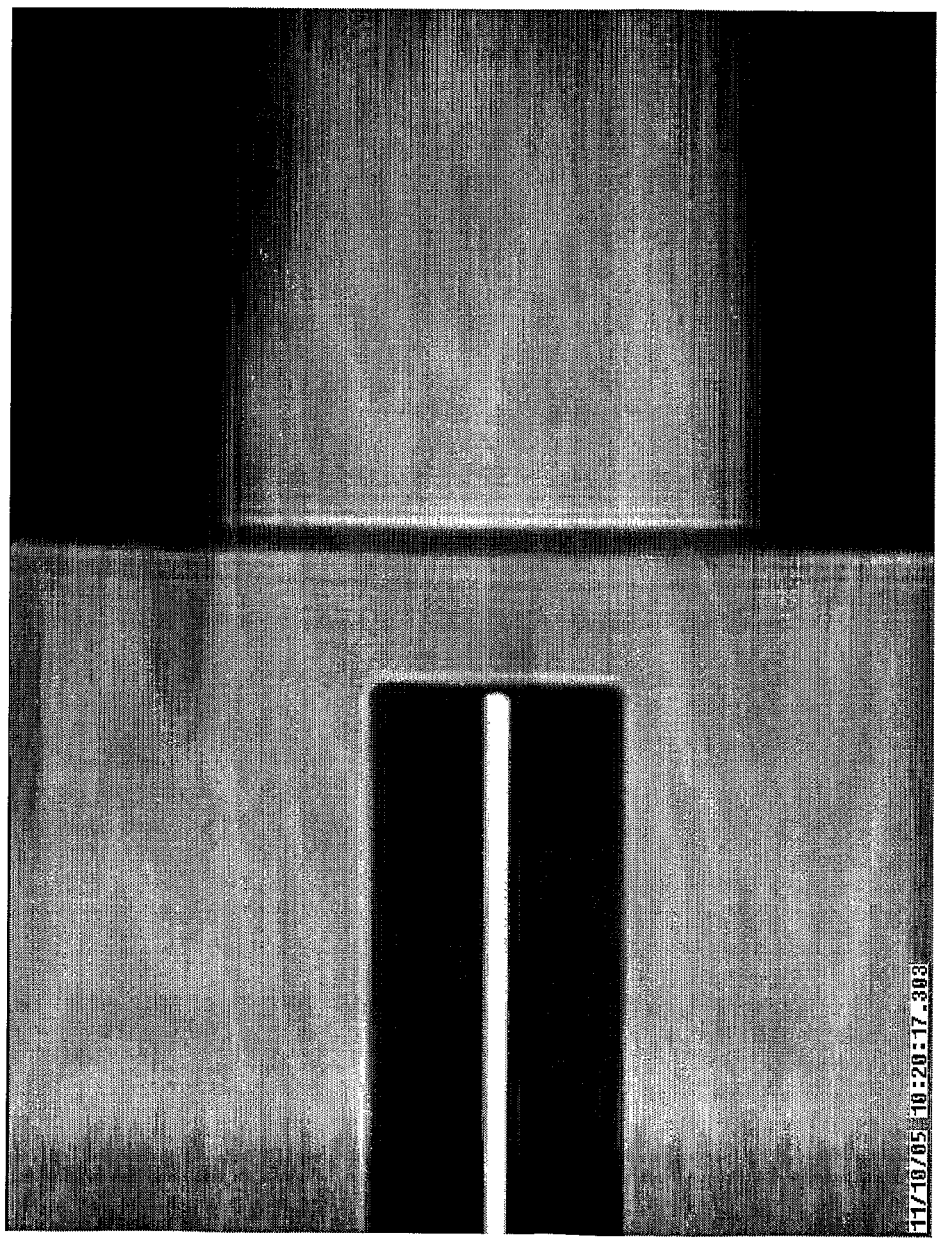
FIG. 15a is a photograph or picture, as captured by the imaging system of a fiber splicer, of the ends of two optical fibers having different diameters to be spliced to each other, using the best setting of the imaging system for the left, thinner fiber end for performing an alignment operation using a center-focus method.
Figure 15B:
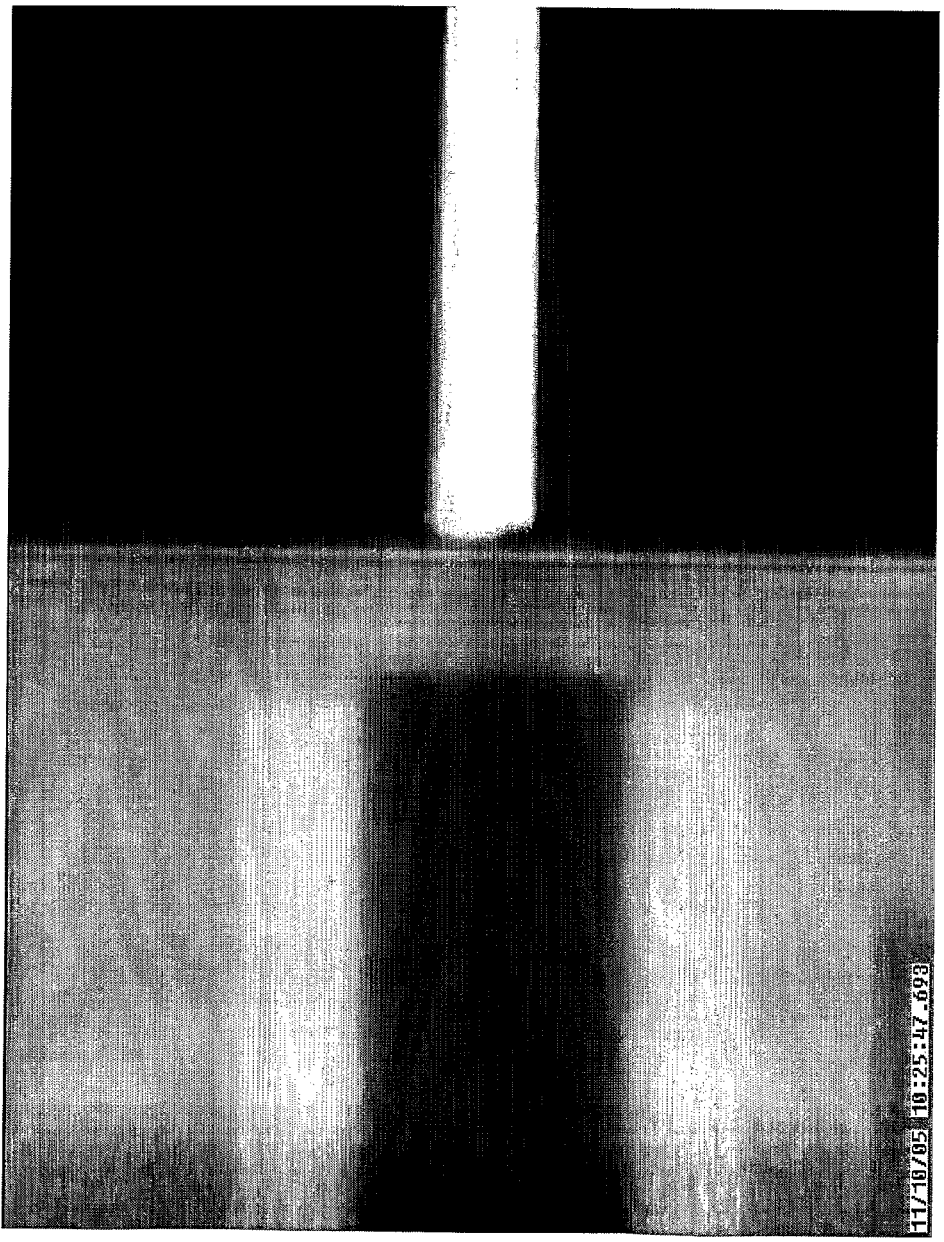
FIG. 15b is a photograph or picture similar to FIG. 15a using the best setting of the imaging system for the right, thicker end for performing an alignment operation using a center-focus method.

(c) If the difference between the cladding diameters of the two fibers to be spliced is relatively large, e.g. larger than 50% or 100%, respectively, of the diameter of the thinner fiber, it may happen that neither the method described under (a) nor the method described under (b) can be used successfully, using only one object plane position for the alignment. In this case, the optimum positions of the object plane 12 for each of the two fibers may instead be used, meaning that first the best position for one of the fiber ends is used to determine a reference position for this fiber end in the image thereof, such as the position of the core 14' thereof, that then the best position for the other fiber end is used to determine the reference position thereof in the image thereof, that thereafter the offset, as viewed in the current one of the X- and Y-directions is calculated, and finally that the fiber ends are repositioned by a suitable displacement in the plane perpendicular to the current viewing direction, to minimize the calculated offset. Hence this method (c) is the general one, working for all cases, but it may require a time period of a significant length. The fact that it may be preferable to use this method for e.g. center-focus alignment appears from the photographs of FIGS. 15a and 15b, where the best object plane positions are used for the thinner and thicker fiber—left and right fiber ends—respectively.

The selection of a suitable method as described under (a), (b) and (c) may, if the cladding diameters of the two fibers to be spliced can be automatically determined by the imaging system 6, 11, be automatically selected according to difference between the cladding diameters. Otherwise, a user may input some command for determining the method to be used and if desired or applicable, whether the image of the left or and right end fiber end will be used for the alignment process.

More details of an automatic optical fiber splicer in which the methods described above can be executed are shown in FIG. 11a. The fibers 13, 13' have their end regions located between points of electrodes 21, between which an electrical discharge 23 is generated for heating the fiber ends, the intensity of the electrical discharge being controlled by the intensity of the electrical current between the electrodes 21. An optical system symbolized by lenses 7, compare also FIG. 1, depicts, in two perpendicular directions, the fiber end regions on the light sensitive areas 9 of two cameras, the light sensitive areas e.g. being plates carrying CCD-elements. A digital imaging processing system 11 is provided for processing the electric signals from the light sensitive areas 9 and thereby to monitor the fibers 13, 13' used and the splicing procedure by controlling fiber positioning devices and the intensity of the electrode current. The image processing system is connected to a monitor or display element 29 for showing pictures, such as one of the two pictures captured. As indicated in the figure, a picture of a particular type, as composed by the image processing system 11, may also show the splicing position between the fiber ends as viewed in the two perpendicular directions and positioned above each other.

In the schematic picture of FIG. 11b some more electrical details of a fiber splicing device of the automatic type are shown. Thus, the splicing device has fixtures or retainers 31, in which the end portions of the fibers 13, 13' are placed and firmly held during the positioning and the splicing. The fixtures are movable in three orthogonal coordinate directions both in parallel to the longitudinal direction of the fibers, the Z-direction, and in two directions perpendicular to this direction, the X- and Y-directions. The fixtures 31 are thus displaced along suitable mechanical guides, not shown, by control motors 33. Electric lines to the electrodes 21 and to the light sources 1, the motors 33 and the cameras 6, only one shown in this figure, extend from an electronic circuit module 35, from driver circuits 39 and 41 respectively, and from a video interface 43 in the electronic circuit module 35. The control lines to the cameras are used for displacing the object plane of the optical system included in the respective camera. A suitable image signal is from the video interface 43 delivered to the image processing and image analysis unit 11. The various procedural steps are controlled by a control circuit unit 45, e.g. including one or more suitable electronic microprocessors. The control circuit 45 performs the procedural steps mentioned above and thus controls the displacement of the fiber ends in relation to each other by energizing the motors 33 in suitable displacement directions, and provides a signal to the image processing and image analysis unit 11 for starting analysis operations of different kinds of an obtained picture. Further, the control circuit 45 controls the time, when a fusion current is to be started to be provided to the electrodes 21 and the time period during which this current is to be delivered and the intensity of the current.

Thus, in a splicing operation ends of the fibers 13, 13' are first clamped in the fixtures 31, the fiber ends are aligned using the light sources 1, cameras 6 and motors 33 as controlled by electronic circuit unit 35 and finally the ends are spliced by energizing the electrodes 21 so that an electric discharge is created heating the fiber ends and thereby fusing them to each other.

For making the choice whether only one object plane position is to be used or object planes positions determined for both fiber ends are to be used in the alignment process a unit 193 in the control circuit unit 45 may be provided. This unit may then include a subunit 194 for accessing the diameters of diameters of the two fiber ends, such as receiving values representing the diameters from e.g. manual input, or it may be adapted to command the imaging system 6 to capture a picture and the image unit 11 to determine such values from the captured image. Furthermore, the unit 193 can include a subunit 195 for comparing the values of the diameters and a subunit 196 for making the very decision or choice.

The control circuit unit 45 may further include a general unit 197 for aligning using some determined optical settings and it can in turn include a subunit 198 for positioning the fiber ends in their longitudinal direction. Other units included in the electronic circuit unit 35 and in the exemplary embodiment specifically described to be included e.g. in the control circuit unit 45 and the image unit 11 will be described below.

The various methods for finding suitable object plane positions and for positioning and alignment of optical fibers described above will now be briefly discussed with reference to the simplified program flow charts of FIGS. 10a, 10b, 10c and 10d and corresponding units included in the electronic circuit module 35.

The flow chart of FIG. 10a illustrates the major steps used in order to find the self-focusing position or the setting of optical system in which the self-focusing effect is achieved and the use thereof for aligning two fibers. A selected viewing direction, the X- or Y-direction, is used in all steps of the procedure. In a first step 201 the two fibers, the ends of which are held and clamped by the fixtures 31, are roughly prealigned. The prealignment step may e.g. be performed manually or by a prealignment unit 51 in the control circuit 45, assisted by suitable units of the image processing and analysis unit 11, see FIG. 11b. Such a prealignment unit 51 may control the motor or motors 33 to displace the fixtures 31 accordingly, as guided by pictures automatically taken by the camera 6 and analyzed by suitable units, not shown, of the image unit 11, the unit 51 then sending also appropriate commands to the video interface 43 and the image unit.

Figure 12A:
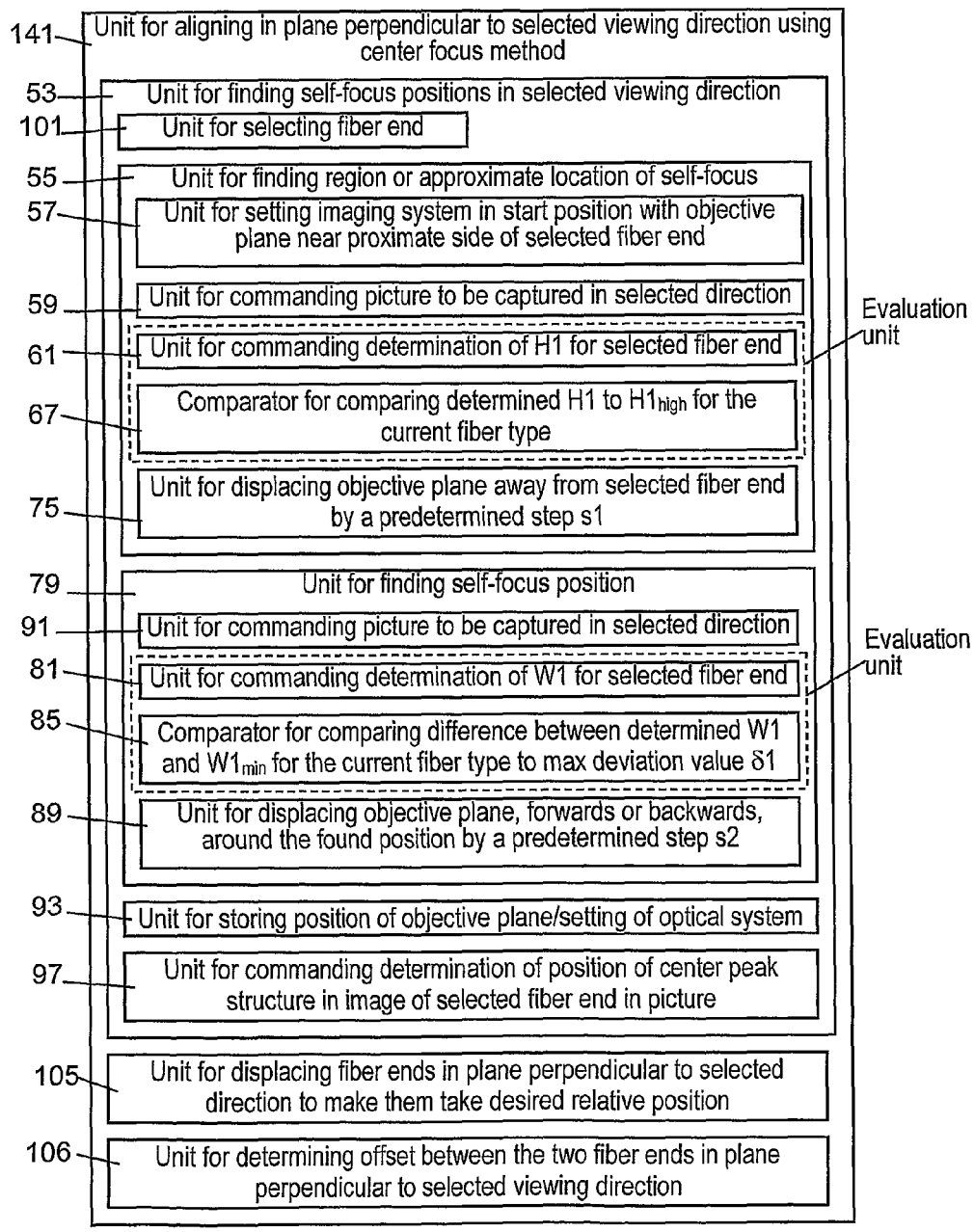
FIG. 12a is a block diagram of an alignment unit using a center-focus method.

Then, the procedure for finding the desired settings is started by entering a first subprocedure for finding a region in which the self-focusing position will then be searched. This is made by activating a general unit 53 for determining the self-focusing position and a unit 55 therein for executing the first subprocedure, i.e. for first finding a region of the setting of the object plane 15 where the self-focus position can be expected to be located, these units included in the control circuit unit 45, see also FIG. 12a. First, in a step 203, the imaging system 6 is set in a suitable initial position, also called start position, in this case so that the object plane 15 of the optical system 7 is placed near the side of the fibers that face the imaging system, this side called the proximate side. It can be executed by a corresponding unit 57 that sends appropriate signals, e.g. to the optical system 7 through the driver circuits 41, and if required, to the video interface 43 and the image unit 11 for checking that the desired proximate position has been achieved. The setting procedure for a first of the held fiber ends as viewed in a selected direction is then started in a step 205, executed in a unit 59, in which a picture of the two adjacent fiber ends is taken. The unit 59 then commands the video interface 43 accordingly and the captured picture is received by the image processing and analysis unit 11. In the next step 207 the height H1, that may be a relative height or a total contrast value as described above, of the center peak structure of the intensity profile for the image of the first fiber end in the captured picture is determined, this being activated by a unit 61 that commands a unit 63 in the image unit 11 to achieve an intensity profile from the image of the selected fiber end in the captured image and a unit 65 to determine the value H1 from the intensity profile.

Then it is determined whether the determined value H1 is larger than or equal to a threshold value $H1_{high}$ valid for the type of fibers to which the fiber belongs that has the fiber end from the image of which the intensity profile and the value H1 was derived. This is performed in a step 209, by a comparing unit 67, that for the threshold value $H1_{high}$ uses a value taken from a table of parameters for fibers of different types stored in a memory place 69 in a memory 71, the type to which the fiber having the current fiber ends belongs being stored in memory place 73, see also FIG. 11b. If the result of the comparison is negative, a step 211 is performed in which the object plane 15 of the optical system 7 is displaced by a predetermined step or a step having a predetermined length away from the fibers in the selected viewing direction. A unit 75 then sends a command to the imaging system 6 to change the setting of the optical system by a step of length s1 taken from a memory place 77. Then the steps 205, 207 and 209 are again performed, as executed by the respective units.

If it was determined in step 209 that the height H1 fulfills the condition, the first subprocedure is terminated and a second subprocedure is entered, by activating a unit 79 included in the unit 53 in the control circuit unit 45. Then, a step 213 is performed in which the width W1 of the central peak of the intensity profile for the image of the first fiber end is determined, this being controlled by a unit 81 in the unit 79 commanding a unit 83 in the image unit 11 to process the intensity profile that has already been determined by the unit 63. In a step 215 is then determined whether the determined width is sufficiently small, i.e. deviates from the value $W1_{min}$ characteristic of the fiber type by an amount smaller than a predetermined deviation value $\delta 1$. The comparing operation is executed in a comparator 85 in the control unit 45 that takes the values $W1_{min}$ and $\delta 1$ from the table in the memory place 69 and from a memory place 87 for storing predetermined maximum deviation values, respectively.

If the determined width W1 is not sufficiently small, the setting of the imaging system is in a step 217 changed by a predetermined amount, i.e. an adjustment of the optical system 7 is made to displace the object plane 15 by a predetermined step s2, i.e. by a step having a predetermined length s2, this displacing being made starting from the new start position of the object plane found after leaving the first subprocedure, i.e. after the step 209 when the condition therein was fulfilled, and around, forth and back, around this position. In practice, this changing of the setting can be made in the following way:

1. Select a direction, e.g. away from the selected fiber end.
2. Displace the object plane 15 in selected direction by displacement step s2.
3. Continue with steps for taking pictures and determining W1 for selected fiber end.
4. If the determined values of W1 have an increasing tendency, return to the new start position defined above and change the direction to the opposite direction, e.g. towards the selected fiber end.
5. Perform steps 2-4 again.

The changing step can be commanded by unit 89 taking the value s2 of the step length from the memory place 77. The step length s2 may preferably be smaller than the step length s1 used in previous subprocedure and even significantly smaller. A picture in the selected viewing direction is again captured in a step 219, as commanded by a unit 91. The step 213 is then performed again.

If the width W1 is determined to be sufficiently small in step 215, the self-focus position of the object plane 15 has been reached and the second subprocedure is terminated. The current setting of the optical system 7 may be stored in a step 221, as executed by unit 93 storing a value representing the setting in a memory place 95 associated with the selected fiber end. Then the position of the center of the center peak structure of the intensity profile, or alternatively some equivalent quantity such as the position for which the maximum value is taken in the center peak structure, may be determined in a step 223. The execution of this step can be controlled by a unit 97 that sends a command to a unit 99 in the image unit 11 that performs the necessary calculations. For instance, the method using the derivative of the intensity profile as described above can be used. However, this method requires that there is a sufficient number of pixels in the regions of the intensity profile where the sides of the center peak are located. If the sides are too steep, it may be impossible to determine the derivative with a satisfactory accuracy. In that case, the object plane 15 can be displaced a little from the found position for self-focusing, such as by some predetermined step, i.e. a step having some predetermined length, in an arbitrary one of the two opposite directions. If required, the center of the center peak may be determined from a plurality of intensity profiles taken from different parallel lines, perpendicular to the considered fiber end, as described with reference to FIG. 9 and/or for a few different positions of the object plane 15 around the found optimum one.

The steps for determining the position of the center peak in the image of the selected fiber end in a captured picture/captured pictures may for example be as those illustrated in the flow chart of FIG. 10b.

After the position of the central peak in the intensity profile obtained from the image of the first fiber end has been determined in step 223, the same procedure, i.e. steps 203-223, is in a step 225 repeated for the other fiber end that is visible in the same pictures. This can be controlled by unit 101 for selecting a fiber end, such as the left or right fiber end, using a memory place 103 for storing an indicator of the current fiber end the image of which is being or is to be analyzed. In a final step 227 the fiber ends held by the fixtures 31 are moved, by activating at least one of the motors 33, in the plane perpendicular to the selected viewing direction, by a step or distance determined from the determined positions of the centers of the central peaks in the pictures of the two fiber ends, to align the central peaks with each other, thereby achieving the desired "center-focus" alignment actually giving an alignment of the fiber claddings 14 as seen in the selected viewing direction. Alternatively, the fiber ends may in the moving operation be placed at a desired distance $DX_{des}$, $DY_{des}$ of each other as observed in the selected viewing direction. The moving step 227 can be executed and controlled by a unit 105 in the control unit 45 that in turn can use a unit 106 for determining the offset between the two fiber ends as seen in the plane perpendicular to selected viewing direction, this unit e.g. calculating the difference between the positions determined in step 223 as calculated by the unit 99.

The same procedural steps as illustrated in FIG. 10a may then be performed for the other viewing direction, as controlled by a unit 107 for selecting a viewing direction, such as a horizontal or vertical viewing direction or a front or rear viewing direction, using a memory place 109 for storing an indicator of the current viewing direction for which pictures are being or are to be analyzed.

For determining the position of the center peak, i.e. some measure of the center thereof or of the position for which a maximum is taken, in the intensity profile obtained from the image of a fiber end in a captured picture, as described above for step 223, a procedure may be executed such as that illustrated by FIG. 10b involving a "defocusing" operation. It is as above assumed that a viewing direction has been selected. In a first step 301 a direction for displacing the object plane 15 of the optical system 7 is selected. This direction is either away from or towards the considered fiber end. In the next step 303 an intensity profile is determined along a first line in the image of the selected fiber end in a picture that has been previously captured. The derivative of the intensity is then determined in a step 305 and the positive and negative peaks in the derivative that indicate the sides of the central peak are then determined in a step 307, see FIG. 7 and the description above referencing this figure. The determination includes that the regions of these peaks are determined and in particular that the number of pixels, i.e. points or discrete arguments of the intensity profile function, in each such region is determined, see step 309. It is then asked in a step 311 whether these determined numbers are sufficient, such as that the numbers are larger than or equal to a predetermined number p, for obtaining, in a later step, a satisfactory determination of the positions for which the extreme values of positive and negative steps are taken. If the numbers are not sufficient, a step 313 is performed in which it is asked whether the defocusing in the selected direction has been too far, i.e. whether the number of steps in the selected direction is larger than or equal to a predetermined number d. If this is true, the selected direction is changed in a step 315 and the object plane is displaced to its start position in a step 317. After this step, and also after step 313 in the case where the steps in the selected direction has not been too many, the object plane 15 of the optical system 7 is displaced, by a step having a length s3, in the selected direction in a procedural step 319. This is the "defocusing" step. In the next step 321 a picture is captured and thereafter the step 303 is again performed.

If it was decided in step 311 that the numbers of pixels were sufficient, a step 323 is performed in which the positions of the extreme values or alternatively the centers of the positive and negative peaks in the derivative are determined. A measure of the position of the center or the actual maximum of the central peak in the intensity profile is determined in a step 325 by taking the mean of the positions determined in the previous step. In an optional step 327 the intensity profile is determined along another line in the captured picture, if a sufficient number of intensity profiles have not yet been determined and analyzed. Then, as performed earlier, the derivative of this intensity profile is determined in a step 329, the positive and negative peaks in the derivative are localized in a step 331, and then the step 323 is again performed. If intensity profiles along a sufficient number of parallel lines have been analyzed, as determined in the step 327, an accurate position of the central peak in the image of the considered fiber end in the latest captured pictured is in a final step 333 determined in some suitable way, such as calculating the mean or average of the mean values as determined in step 325 or, in order to get a more accurate measure suitable for the alignment process, using the method of linear regression discussed above, fitting the determined mean values to a straight line and taking the position of the peak as the point where this straight line hits the splicing plane, the splicing plane generally being the plane perpendicular to the longitudinal direction of the held fiber ends that extents through the points of the electrodes 21 and conceived as a vertical line in the captured pictures.

Figure 12B:
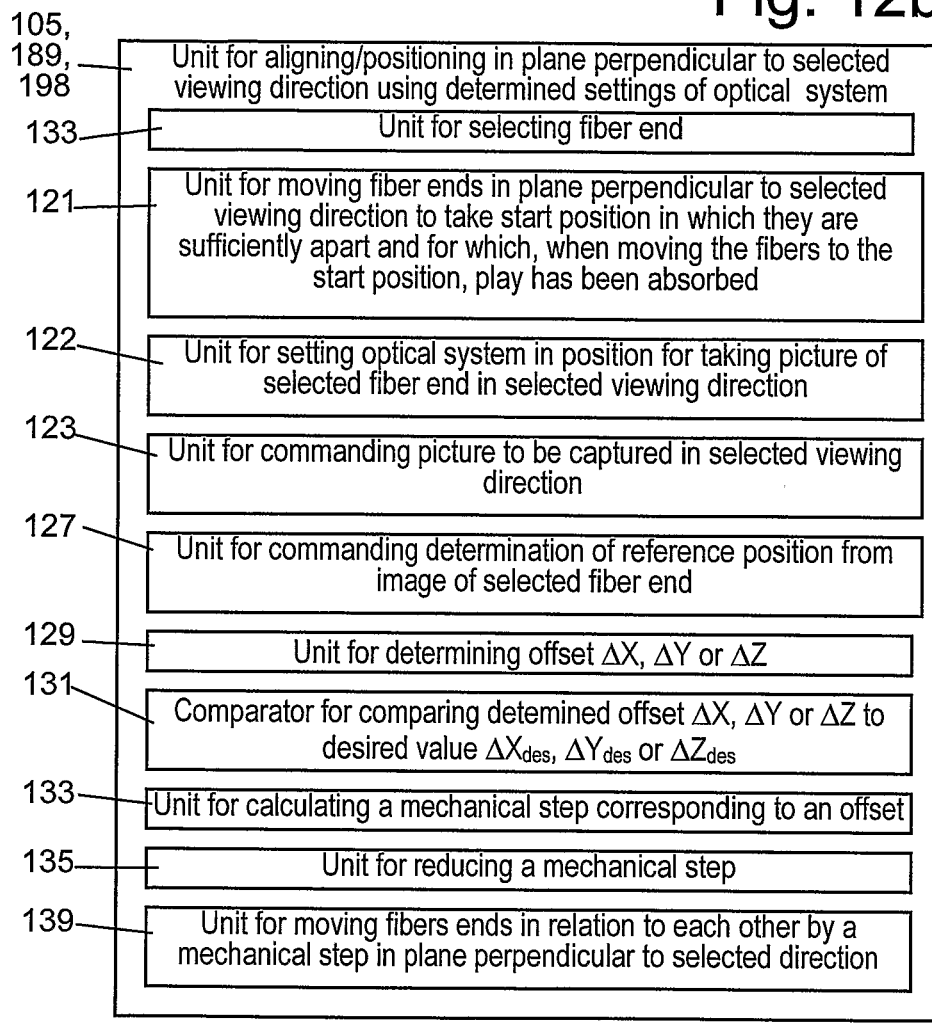
FIG. 12b is a block diagram of an alignment unit using a cascade method.

The procedure in the step 227 described with reference to FIG. 10*a* may be performed in a "cascade" manner, as illustrated by the steps of the flow-chart of FIG. 10*c*, and using units illustrated in FIGS. 11*b* and 12*b*. In a first step 401, executed and controlled by a unit 121, the fiber ends are moved in relation to each other, in the plane perpendicular to a selected viewing direction, a distance to place them so that they sufficiently apart from each other. Then they are moved in the opposite direction to absorb mechanical play. E.g., if the mechanical play is equal to P and the desired offset value in the selected viewing direction is equal to $\Delta_{des}$, the fiber ends have to be relatively moved a distance of at least $(P+\Delta_{des}+r)$ from a position of approximate alignment or prealignment away from each other and then the distance P in the opposite direction, where r is a small, predetermined quantity.

The optical system 7 of the imaging system or camera 6 is in step 403 set for taking a picture of a first one of the two fiber ends, e.g. by fetching information on the setting from one of the memory cells 95, or the memory cells 183 to be described hereinafter. This step can be executed by a unit 122. In the next step 405 a picture is taken, as commanded by a unit 123. A reference position, such as the position of the center of the central peak in the image of the considered fiber end in the captured picture or the position where the maximum of the central peak is located or the position of an end surface in the captured picture, is determined in a step 407, this step activated and controlled by a unit 127. The unit 127 commands an appropriate unit in a unit 129 in the image unit 11 to determine the reference position, such as by activating the unit 99 described above to determine the position of the center peak or some other unit such as a unit 131 for determining the position where the central peak takes its maximum value or a unit 132 for determining the position of the end surface in the image of the first fiber end. The unit 131 may e.g. use the Chi-Square fitting method described above. In the following steps 409, 411 and 413 the three preceding steps 403, 405 and 407 are repeated for the second fiber end. This can be executed by the same units as described for the three preceding steps, controlled by a unit 133 for selecting the fiber end the image of which is to be processed, the unit 133 e.g. using the memory cell 103.

After the reference positions in the images of the two fiber ends have been determined by performing twice the step 413, the offset or distance $\Delta X$, $\Delta Y$ or $\Delta Z$ between the determined reference positions in the images is determined in a step 415, this being executed in a unit 129. In the next step 417 it is asked whether the determined offset is sufficiently equal to a desired offset or distance value $\Delta X_{des}$, $\Delta Y_{des}$ or $\Delta Z_{des}$, respectively, such as deviates from it by at most an amount $\delta 4$ or $\delta 5$. This desired offset or distance value as obtained from the picture corresponds to a real, mechanical desired offset or distance value $DX_{des}$, $DY_{des}$ or $DZ_{des}$. This step can be executed in a comparator 131 using the respective maximum deviation value $\delta 4$, $\delta 5$ taken from the memory place 87. If the result of the comparing operation is that the offset or distance is sufficiently close to the desired value, the procedure is terminated. Otherwise, a corresponding distance for mechanically moving the fiber ends in relation to each other is calculated in a step 419, executed in a unit 133, using a value of the magnification of the camera 6. The calculated distance is reduced by a factor in the next step 421, in which a unit 135 takes a factor from a memory place 137, possibly a table, in which factors for use for different distances are stored. The fiber ends are then moved in relation to each other in the plane perpendicular to the selected, considered viewing direction in a step 423, a distance or displacement step equal to the reduced, calculated step, this being controlled by a unit 139, in the same direction as in the last part of step 401 used to absorb the play. Then the procedure is performed again, starting with step 403 and continuing to repeat the procedure until it is determined in step 417 that the offset determined from the pictures taken sufficiently with the desired value.

Obviously, instead of using the offsets or distances $\Delta X$, $\Delta Y$ or $\Delta Z$ directly obtained from captured pictures and the corresponding desired offset or distance values $\Delta X_{des}$, $\Delta Y_{des}$ or $\Delta Z_{des}$ for the comparing operation of step 417, the corresponding mechanical offsets or distances DX, DY or DZ and the desired mechanical offsets or distances $DX_{des}$, $DY_{des}$ or $DZ_{des}$ can be used, this requiring a calculation such as that performed in step 419.

Figure 12C:
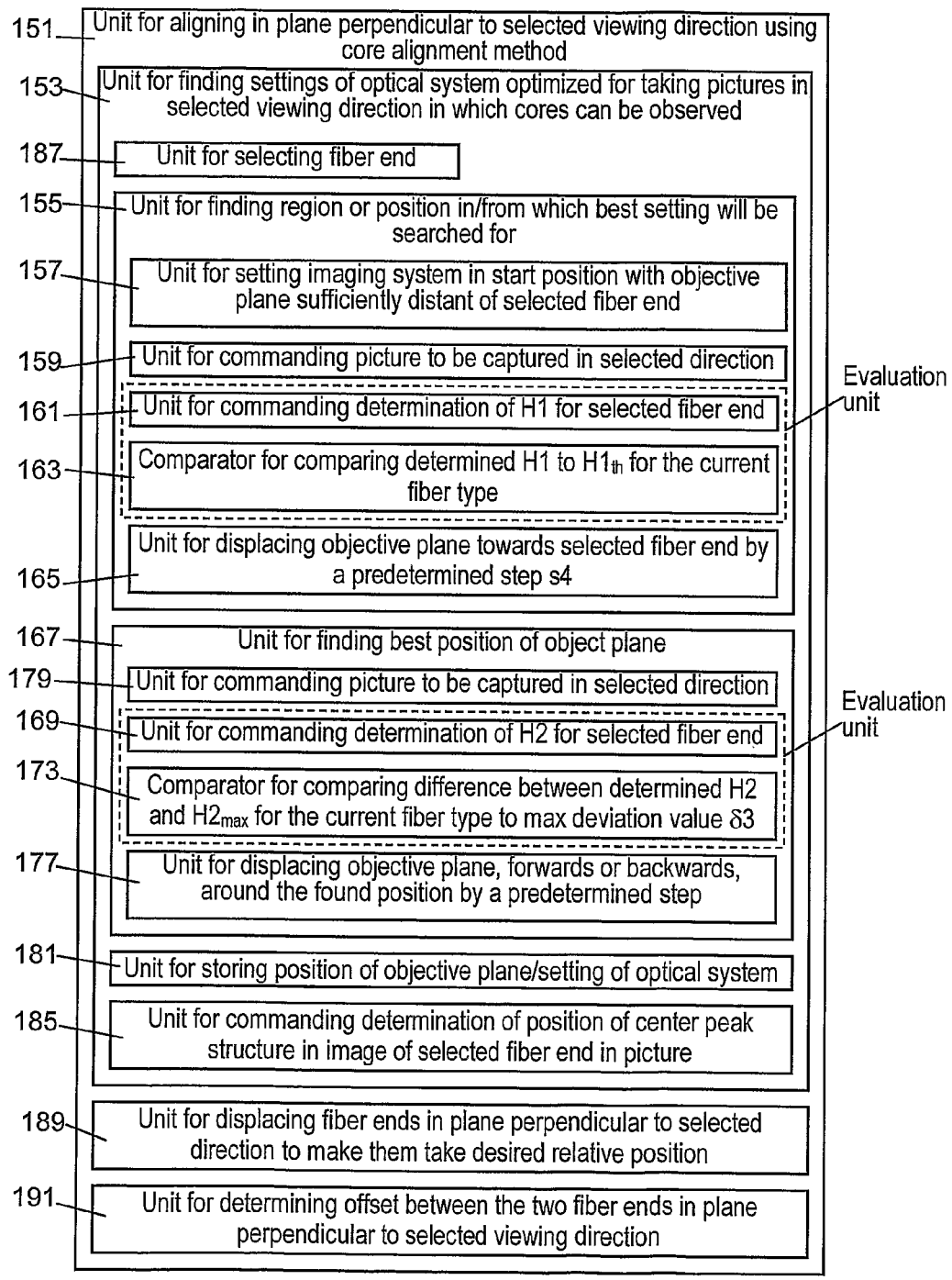
FIG. 12c is a block diagram of an alignment unit using a core alignment method.

The core alignment method will now be briefly described with reference to the flow-chart of FIG. 10*d* and the units illustrated in FIGS. 11*b* and 12*c*. The procedural steps of this method can be controlled by a core alignment unit 151. In a first step 501 the two fiber ends are prealigned, as e.g. executed by the unit 51 or by a unit 141 for executing the center-focus method, the unit 141 e.g. including the various units described above for executing this method. The best object plane positions are determined by a unit 153.

Next, a subprocedure for determining a suitable range in which the best possible position of the object plane 15 will then be searched, is started, or a suitable first position from or around which the best possible position of the object plane 15 will then be searched, this controlled by a unit 155. The imaging system 6 is, for the selected viewing direction, in the second step 503 set to have its object plane 15 sufficiently remote of the fiber ends, i.e. at a relatively large distance thereof or in a distant position, this being executed by a unit 157 that sends appropriate commands to the imaging system 6. In the next step 505 a picture is then captured in the selected viewing direction, as commanded by a unit 159, and in a step 507 the value H1 is determined for a selected one of the two held fiber ends, in the same way as described above for step 207. A unit 161 controls the determination of the value H1 by sending control signals to the unit 63 for determining an intensity profile from the image of the selected fiber end in the captured image and to the H1 determining unit 65. Alternatively, the unit 161 may, in the same way as for many other units described herein, itself contain subunits, not shown, for executing one or more of the elementary steps such as said two steps included in the determination of H1. The determined value H1 is compared to the threshold value $H1_{th}$ in step 509, this step executed by comparator 163 finding the value $H1_{th}$ for the respective fiber type in the table stored in the memory place 69. If the result of the comparing is that the determined value H1 is larger than the threshold value, a step 511 is performed in which the object plane 15 of the imaging system 6 is moved towards the fiber ends, in the selected viewing direction, a predetermined step s4, i.e. by a step having a predetermined length s4. This step is executed by a corresponding unit 165 that accesses the value of s4 from the memory place 77. If it is determined in step 509 that the determined value H1 is smaller than or equal to the predetermined threshold value $H1_{th}$ the subprocedure for finding a suitable range or region or first position has been terminated.

Another subprocedure for finding the best object plane position for obtaining image produced by the core 14' is then entered, this being executed by a unit 167. For the captured picture and the image of the selected fiber end, the value H2 is determined in step 513, as controlled by a unit 169 that commands the unit 63 to determine an intensity profile and a unit 171 for determining the value H2 from the intensity profile. In the next step 515 it is asked whether the determined value H2 is sufficiently high, i.e. deviates from the assumed maximum value $H2_{max}$ by at most an amount δ2. This is executed in a comparator 173, fetching the maximum value $H2_{max}$ from the table stored in the memory place 69 and the deviation value 52 from the memory place 87. If it is determined in step 515 that the value H2 is not sufficiently high, a step 517 is performed in which the object plane 15 of the optical system 7 is moved forwards and backwards around the position that the object plane had when leaving the first subprocedure and entering the second subprocedure, i.e. when entering step 513, in the same way as described above for step 217 in FIG. 10a. The movement is made in steps of the predetermined length s5, this length preferably being smaller, such as significantly smaller, than the predetermined step length s4 used in searching for the start position for this subprocedure of finding the best object plane position, see block 511. The movement is controlled by a unit 177 retrieving the step length s5 from the memory place 77 and sending the appropriate commands to the imaging system 6. Then a picture is taken in the selected viewing direction, in step 519 and as controlled by a unit 179. The second subprocedure is then performed again starting with step 513. If it is determined in step 515 that the value H2 is sufficiently high, this subprocedure is terminated.

The actual setting of the optical system 7 may now be stored in a step 521, such as commanded by a unit 181 storing the setting in the respective one of two memory places 183. Then the position of the center of or of the maximum of the center peak in the center peak structure or some equivalent quantity in the intensity profile may be determined in a step 523. The execution of this step can be controlled by a unit 185 that sends a command to some unit included in the reference determining unit 129 that performs the necessary calculations. If required, the center of the center peak may be determined from a plurality of intensity profiles taken from different parallel lines, perpendicular to the considered fiber end, as described with reference to FIGS. 9 and 10b.

After the position of the central peak in the image of the selected fiber end has been determined in step 523, the whole procedure including the steps 501-523 is in a step 525 repeated for the other of the two fiber ends that are visible in the same pictures, for the same selected viewing direction. This can be controlled by unit 187 for selecting a fiber end, such as the left or right fiber end, using the memory place 103 for storing an indicator of the current fiber end the image of which is being or is to be analyzed. In a final step 527 the fiber ends held by the fixtures 31 are moved in relation to each other, by activating at least one of the motors 33, in the plane perpendicular to the selected viewing direction, by a distance determined from the determined positions of the central peaks in the images of the two fiber ends, to align the central peaks with each other, thereby achieving the desired core alignment as seen in the selected viewing direction, or possibly to place the cores at a desired distance of each other. This step can be executed by a unit 189, using e.g. the "cascade method" as illustrated in FIG. 10c. Generally, the unit can use a unit 191 for determining the offset between the two fiber ends as seen in the plane perpendicular to selected viewing direction, this unit e.g. calculating the difference between the positions determined in step 523 as calculated by the unit 99.

Figure 10D:
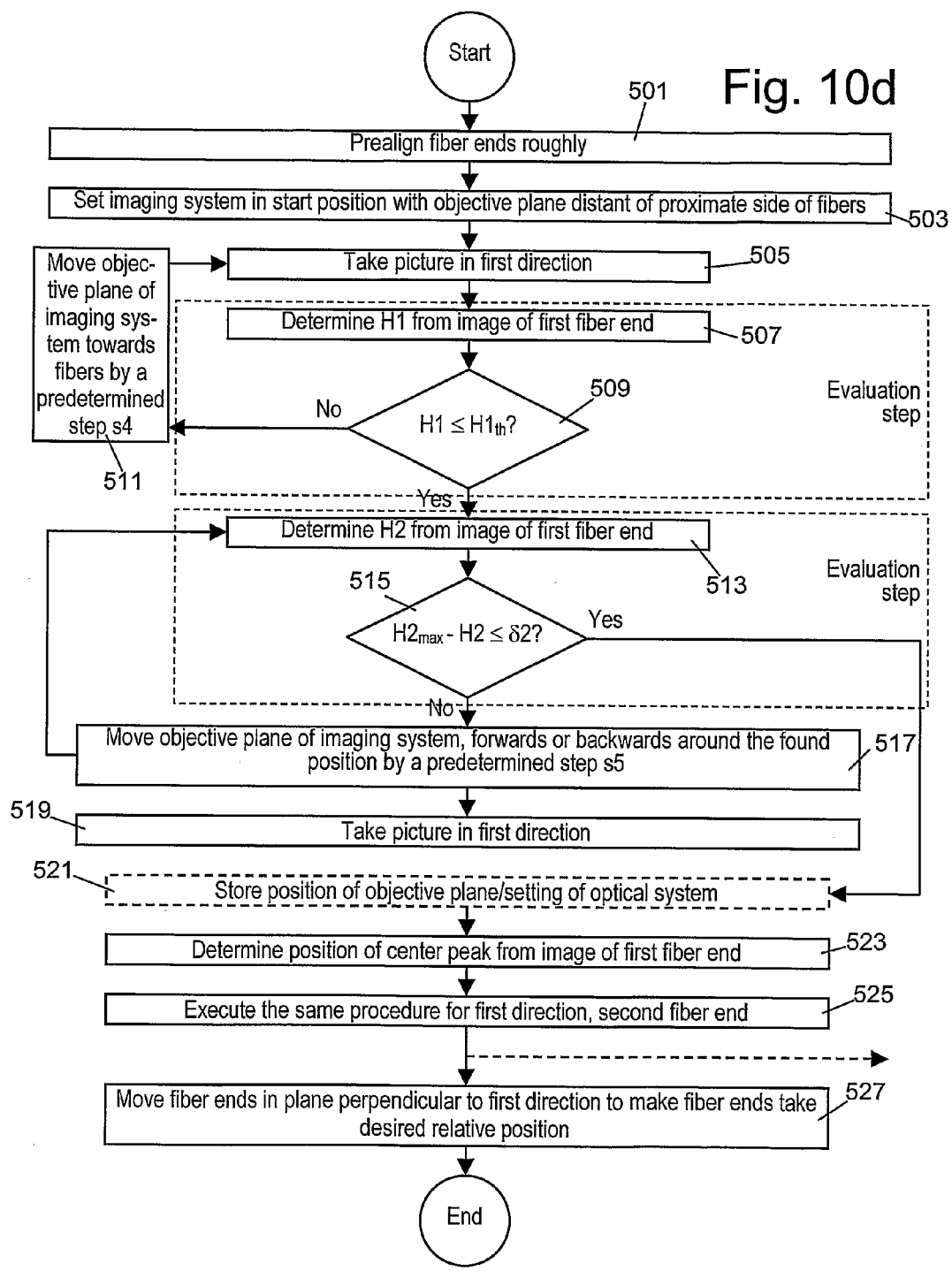
FIG. 10d is a flow chart of an alignment process for optical fiber ends based on pictures showing cores of ends.

As for FIG. 10a, the same procedural steps as illustrated in FIG. 10d may then be performed for the other viewing direction, as controlled by the unit 107 for selecting a viewing direction, using the memory place 109 in which the indicator of the current viewing direction is stored.

In FIGS. 11b and 12a, 12b and 12c specific examples of units and subunits for executing the different tasks and steps of the procedures as disclosed herein have been given and also of their organization and relationship. However, it is obvious for a person skilled in the art that the units and subunits necessary for executing the procedures may be designed, organized and related in a plurality of alternative, equivalent ways, such as that groups of the tasks and steps may be executed by a single unit or subunit instead of being executed by a plurality of units and/or subunits or be executed by a plurality of units and/or subunits different from those described herein, that a unit or subunit for a special task or step may be included in a unit and/or subunit different from that described herein, and that the execution of some of the tasks and steps may be split between a plurality of units and subunits instead of being executed by a single unit or subunit. In particular, the elementary units, i.e. all units executing only a small, element step in the described procedures, illustrated in said figures can be all considered as only included in the electronic circuit unit 35 and not in the various main units executing processes including a plurality of element steps.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

The invention claimed is:

1. A method of finding an alignment position of an object plane of an optical system, the alignment position suited for capturing pictures along an optical axis of the optical system, when aligning two optical fiber ends with each other, the optical system having an object plane, the method comprising the steps of:
   setting the object plane in an initial position,
   capturing, using the optical system, a picture comprising an image of one of the two optical fiber ends,
   evaluating said image in the captured picture,
   displacing, based on the evaluating, the object plane from the initial position along the optical axis to find an alignment position for said one of the two optical fiber ends in which alignment position of the object plane, in a picture captured by the optical system for the alignment position and in the image of said one of the two optical fiber ends, a local contrast value for the image area of the core of said one of the two optical fiber ends, in particular the difference between the brightness, the local contrast value in particular being the maximum brightness, of the image area of the core of said one of the two optical fiber ends and the brightness, in particular the maximum brightness, of longitudinal, relatively bright, separate image areas adjacent to the image of the core of said one of the two optical fiber ends in said image, has a maximum value or deviates from a maximum value by at most a predetermined value, wherein the displacing further comprises
   determining a total contrast value from a determined transverse intensity distribution, in particular determining the total contrast value as a height of a peak structure in the determined transverse intensity distribution, and the total contrast value is determined as a relative contrast value being the difference between the height of the central peak structure, in particular the maximum height or average height, of the central peak structure, and surrounding regions in the determined transverse intensity distribution.

2. The method according to claim 1, wherein the step of displacing comprises:
   displacing the object plane in steps having a predetermined length,
   capturing for each displacement step a picture comprising an image of said one of the two optical fiber ends,
   evaluating said image in the captured picture to find the local contrast value, and
   in the case where the found local contrast value has a maximum value or deviates from a maximum value by at most the predetermined value, taking the position of the object plane as the alignment position and else displacing the object plane the predetermined step length and repeating the process until the condition that the found local contrast value has a maximum value or deviates from a maximum value by at most the predetermined value is fulfilled.

3. The method according to claim 1, wherein the step of evaluating comprises:
   determining from said image in the captured picture a transverse intensity distribution along a line perpendicular to the longitudinal direction of the image in the captured picture corresponding to said one of the two optical fiber ends, and
   determining from the transverse intensity distribution the local contrast value, in particular determining the local contrast value as the difference of the height of a central primary peak to two adjacent side/secondary peaks in a central peak structure.

4. The method according to claim 1, wherein the initial position of the object plane is selected to be located remote of or at a relatively large distance of the side of said one of the two optical fiber ends that faces the optical system and that then the object plane is displaced towards said one of the two optical fiber ends by predetermined steps, in each step a picture being captured and evaluated to find a total contrast value of a central composite, relatively bright longitudinal area in the image of said one of the two optical fiber ends in the captured pictures, the total contrast value in particular being the brightness, in particular the maximum brightness or average brightness, of said central composite area, the displacing stopped and a first position taken when the found total contrast value is smaller than a predetermined threshold or is in the middle of or inside a range of steps in which the found total contrast value is smaller than the predetermined threshold.

5. The method according to claim 4, wherein the total contrast value is determined as a relative contrast value being the difference between the brightness, in particular the maximum brightness or average brightness, of said central composite area, and surrounding areas in said image.

6. The method according to claim 4, wherein after taking the first position smaller predetermined steps are taken around the first position to find the alignment position.

7. The method according to claim 4, wherein said predetermined threshold corresponds to a level smaller than, in particular significantly smaller than, the saturation level of an imaging sensor included in the imaging system and used to capture the pictures.

8. The method according to claim 1, wherein
   the initial position of the object plane is selected to be located remote of or at a relatively large distance of the side of said one of the two optical fiber ends that faces the optical system, and
   the step of displacing comprises:
      displacing the object plane towards said one of the two optical fiber ends by predetermined steps,
      capturing after each step a picture comprising an image of said one of the two optical fiber ends, and
      determining from said image in the captured picture a transverse intensity distribution along a line perpendicular to the longitudinal direction of the image in the captured picture corresponding to said one of the two optical fiber ends,
      stopping the displacing and taking a first position when the determined total contrast value is smaller than the predetermined threshold or is in the middle of or inside a range of steps in which the determined total contrast value is smaller than the predetermined threshold.

* * * * *